US011912039B2

(12) United States Patent
Nakazawa et al.

(10) Patent No.: US 11,912,039 B2
(45) Date of Patent: Feb. 27, 2024

(54) LIQUID DISCHARGING APPARATUS

(71) Applicant: BROTHER KOGYO KABUSHIKI KAISHA, Nagoya (JP)

(72) Inventors: Fumio Nakazawa, Kazaki (JP); Yoshinori Osakabe, Seto (JP); Taichi Shirono, Nagoya (JP); Sosuke Kuroyanagi, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/481,500

(22) Filed: Sep. 22, 2021

(65) Prior Publication Data

US 2022/0097400 A1 Mar. 31, 2022

(30) Foreign Application Priority Data

Sep. 30, 2020 (JP) ................................ 2020-166560

(51) Int. Cl.
*B41J 2/175* (2006.01)

(52) U.S. Cl.
CPC ......... *B41J 2/17553* (2013.01); *B41J 2/1752* (2013.01); *B41J 2/1753* (2013.01); *B41J 2/17556* (2013.01); *B41J 2/17596* (2013.01)

(58) Field of Classification Search
CPC .... B41J 2/17553; B41J 2/1752; B41J 2/1753; B41J 2/17556; B41J 2/17596;
(Continued)

(56) References Cited

U.S. PATENT DOCUMENTS

2004/0070641 A1 4/2004 Inoue
2007/0024682 A1 2/2007 Inoue
2007/0109362 A1* 5/2007 Hori ...................... B41J 2/1752 347/65

(Continued)

FOREIGN PATENT DOCUMENTS

JP 2004122761 A 4/2004
JP 2005059274 A 3/2005

(Continued)

OTHER PUBLICATIONS

International Search Report and Written Opinion dated Nov. 22, 2021 from related PCT/JP2021/035181.

(Continued)

*Primary Examiner* — Matthew Luu
*Assistant Examiner* — Alexander D Shenderov
(74) *Attorney, Agent, or Firm* — Scully, Scott, Murphy & Presser, P.C.

(57) ABSTRACT

A liquid discharging apparatus, having a head, a reservoir section including a liquid reservoir chamber and an atmosphere communication path, a liquid flow path connecting the head with the liquid reservoir chamber, a switching assembly to switch states of the atmosphere communication path between a connecting state and a disconnecting state, and a controller, is provided. The controller is configured to control the switching assembly to switch the states of the atmosphere communication path from the connecting state to the disconnecting state; after switching the states of the atmosphere communication path, control the head to discharge the liquid; and after switching the states of the atmosphere communication path, and in response to a predetermined connection condition being satisfied, control the switching assembly to switch the states of the atmosphere communication path from the disconnecting state to the connecting state.

17 Claims, 14 Drawing Sheets

(58) Field of Classification Search

CPC .. B41J 2/16508; B41J 2/16511; B41J 2/1707; B41J 2/17513; B41J 29/13; B41J 2002/17579; B41J 2/1754; B41J 2/17566; B41J 29/38

USPC ............................................................ 347/86

See application file for complete search history.

(56) References Cited

U.S. PATENT DOCUMENTS

| | | | | |
|---|---|---|---|---|
| 2007/0115317 | A1 | 5/2007 | Nishida | |
| 2011/0228016 | A1 | 9/2011 | Nakamura | |
| 2017/0136778 | A1* | 5/2017 | Kobayashi ............... | B41J 2/175 |
| 2017/0151802 | A1 | 6/2017 | Toba et al. | |
| 2018/0265722 | A1 | 9/2018 | Teramoto et al. | |

FOREIGN PATENT DOCUMENTS

| | | | |
|---|---|---|---|
| JP | 2011194591 | A | 10/2011 |
| JP | 2017-081120 | A | 5/2017 |
| JP | 2017087678 | A | 5/2017 |
| JP | 2017-094658 | A | 6/2017 |
| JP | 2021-160122 | A | 10/2021 |

OTHER PUBLICATIONS

International Search Report and Written Opinion dated Dec. 14, 2021 from related PCT/JP2021/035177.

Office Action dated Mar. 17, 2023 received in U.S. Appl. No. 17/481,496.

Office Action dated Jul. 10, 2023 received in U.S. Appl. No. 17/481,496.

Office Action dated Oct. 17, 2023 received in U.S. Appl. No. 17/481,496.

Notice of Reasons for Refusal dated Nov. 21, 2023 received in Japanese Patent Application No. JP 2020-166560.

Notice of Reasons for Refusal dated Jan. 4, 2024 received in Japanese Patent Application No. JP 2020-166560.

* cited by examiner

LIQUID DISCHARGING APPARATUS

CROSS REFERENCE TO RELATED APPLICATION

This application claims priority under 35 U.S.C. § 119 from Japanese Patent Application No. 2020-166560, filed on Sep. 30, 2020, the entire subject matter of which is incorporated herein by reference.

BACKGROUND

Technical Field

The present disclosure relates to a liquid discharging apparatus capable of performing a discharging action to discharge liquid at a sheet.

Related Art

A liquid discharging apparatus, which may discharge liquid at a sheet, is known. The liquid to be discharged may be supplied from a reservoir section through a liquid supplying path and discharged from nozzles of a head at the sheet. In the reservoir section, in order to maintain negative pressure in the reservoir section within a preferable range, a valve unit may be arranged. In the valve unit, when the negative pressure is within the preferable range, a valve piece may fit closely to a valve seat. On the other hand, as the liquid is consumed, the negative pressure may increase beyond the preferable range, and the valve piece may deform inward into an inner space in the reservoir section and separate from the valve seat. Therefore, the valve may open, and the air may be drawn into the inner space. With the air drawn into the inner space, the negative pressure in the reservoir section may decrease to the preferable range, and the valve may close once again.

SUMMARY

The known liquid discharging apparatus uses the valve piece, which is deformable by the negative pressure in the reservoir section. Therefore, in order to provide the valve piece that may function effectively, a form of the valve piece may become complicated, and/or the valve piece may need to be situated in the reservoir section carefully; otherwise, it may be difficult to draw the air into the reservoir section reliably when required and supply the liquid to the head steadily.

The present disclosure is advantageous in that a liquid discharging apparatus, in which the air may be drawn into the reservoir section reliably when required, is provided.

According to an aspect of the present disclosure, a liquid discharging apparatus, having a head, a reservoir section, a liquid flow path, a switching assembly, and a controller, is provided. The head is configured to discharge liquid. The reservoir section has a liquid reservoir chamber configured to store the liquid and an atmosphere communication path connecting the liquid reservoir chamber with outside. The liquid flow path connects the head with the liquid reservoir chamber for the liquid to flow therein. The switching assembly is configured to switch states of the atmosphere communication path between a connecting state, in which the atmosphere communication path connects the liquid reservoir chamber with the outside, and a disconnecting state, in which the atmosphere communication path disconnects the liquid reservoir chamber from the outside. The controller is configured to control the switching assembly to switch the states of the atmosphere communication path from the connecting state to the disconnecting state; after switching the states of the atmosphere communication path from the connecting state to the disconnecting state, control the head to discharge the liquid; and after switching the states of the atmosphere communication path from the connecting state to the disconnecting state, and in response to a predetermined connection condition being satisfied, control the switching assembly to switch the states of the atmosphere communication path from the disconnecting state to the connecting state.

BRIEF DESCRIPTION OF THE ACCOMPANYING DRAWINGS

Figure 6A:
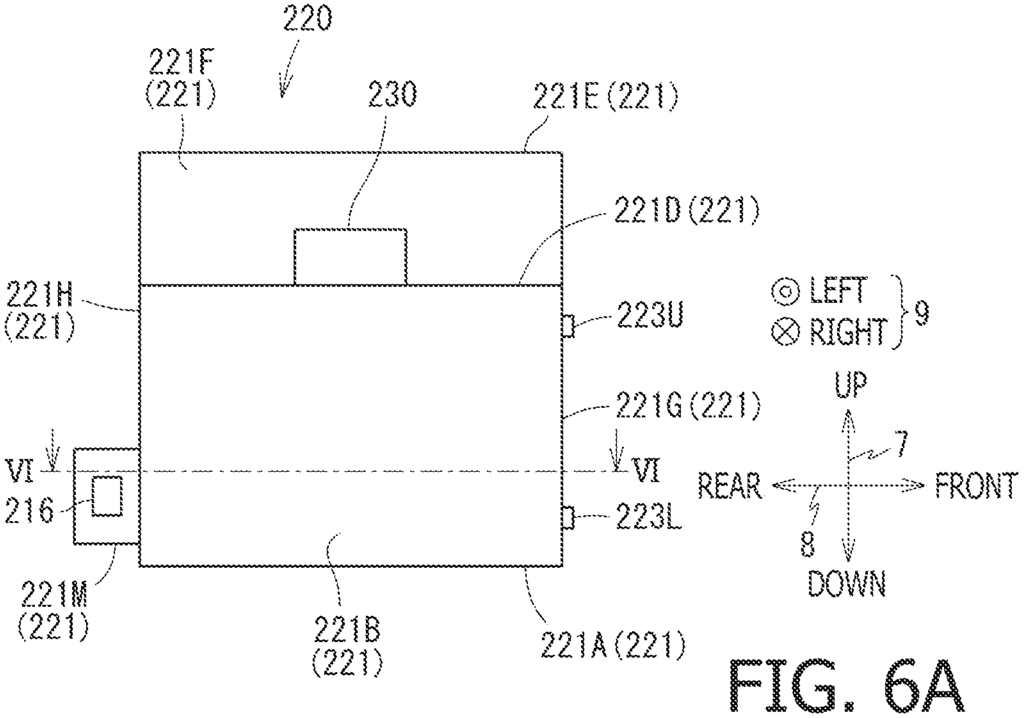
Figure 6B:
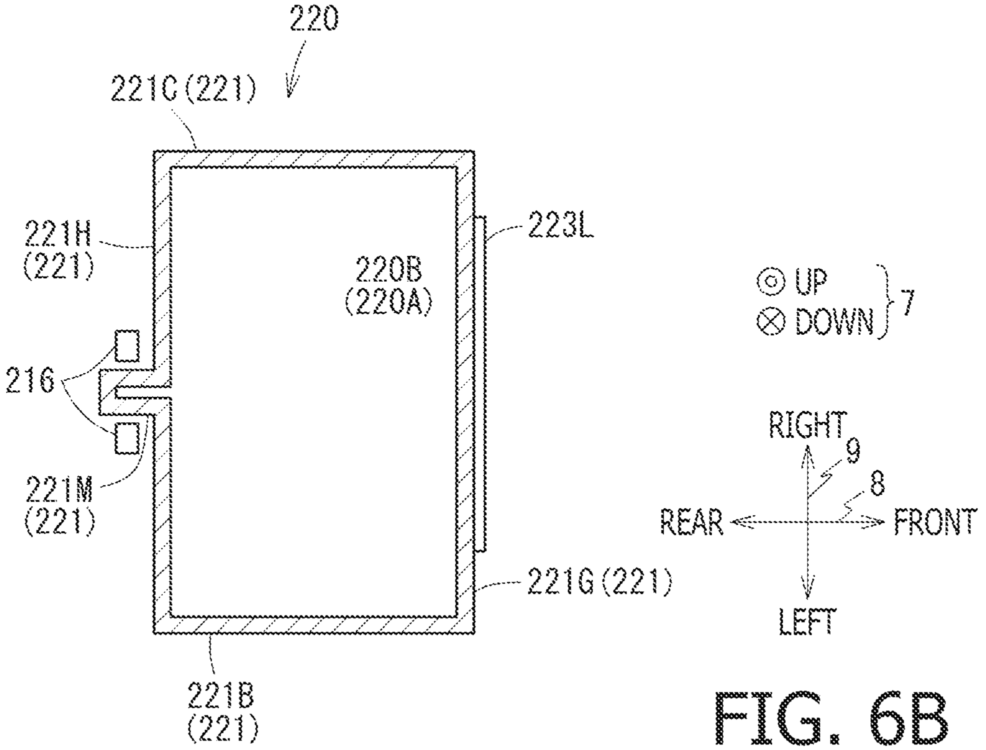

FIG. 6A is an illustrative leftward side view of a liquid amount sensor 216 according to the embodiment of the present disclosure. FIG. 6B is a cross-sectional view of the reservoir section 220 with the liquid amount sensor 216, sectioned at a dash-and-dot line VI-VI indicated in FIG. 6A, according to the embodiment of the present disclosure.

Figure 7:
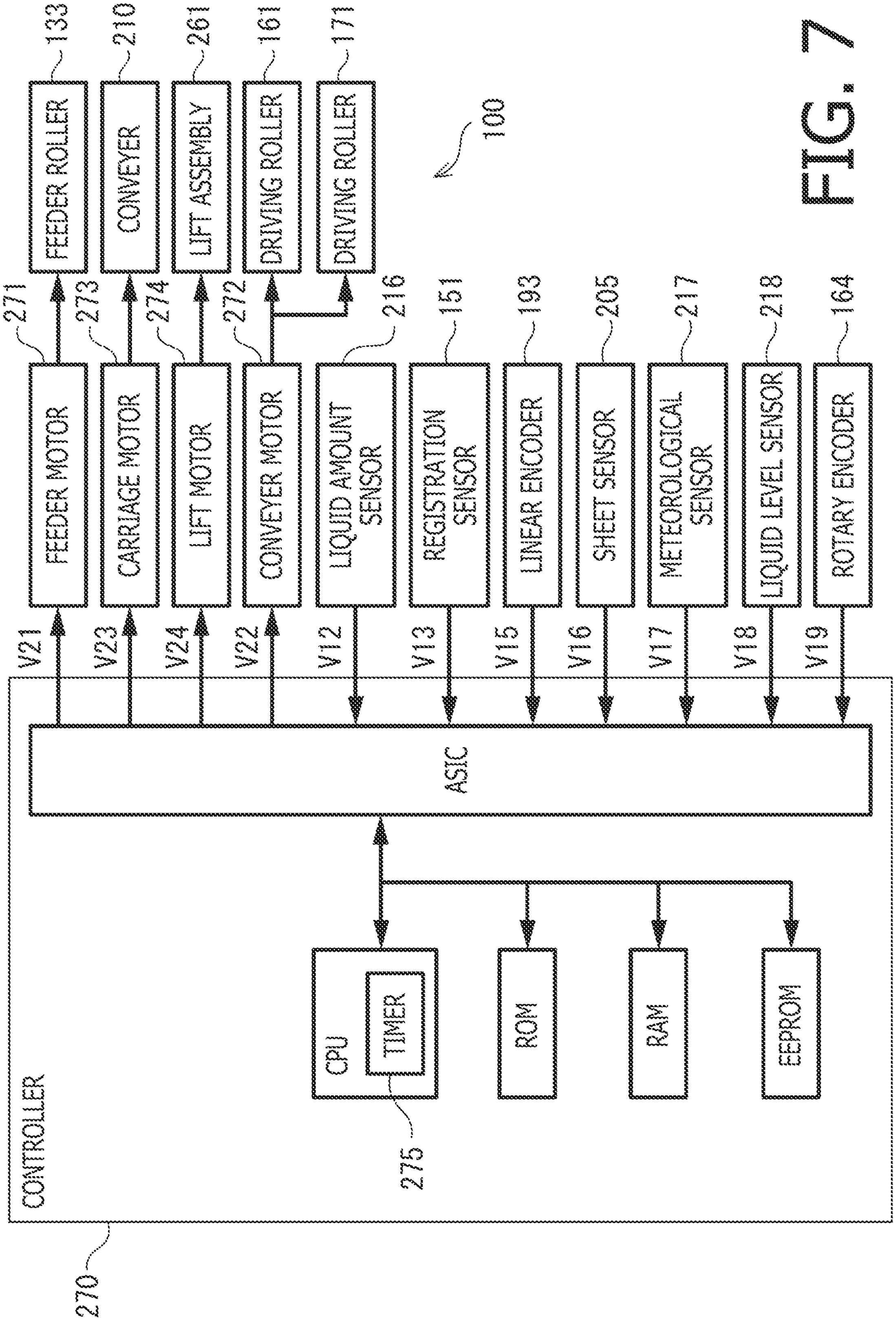

FIG. 7 is a block diagram to illustrate functional blocks in the printer 100 according to the embodiment of the present disclosure.

Figure 8:
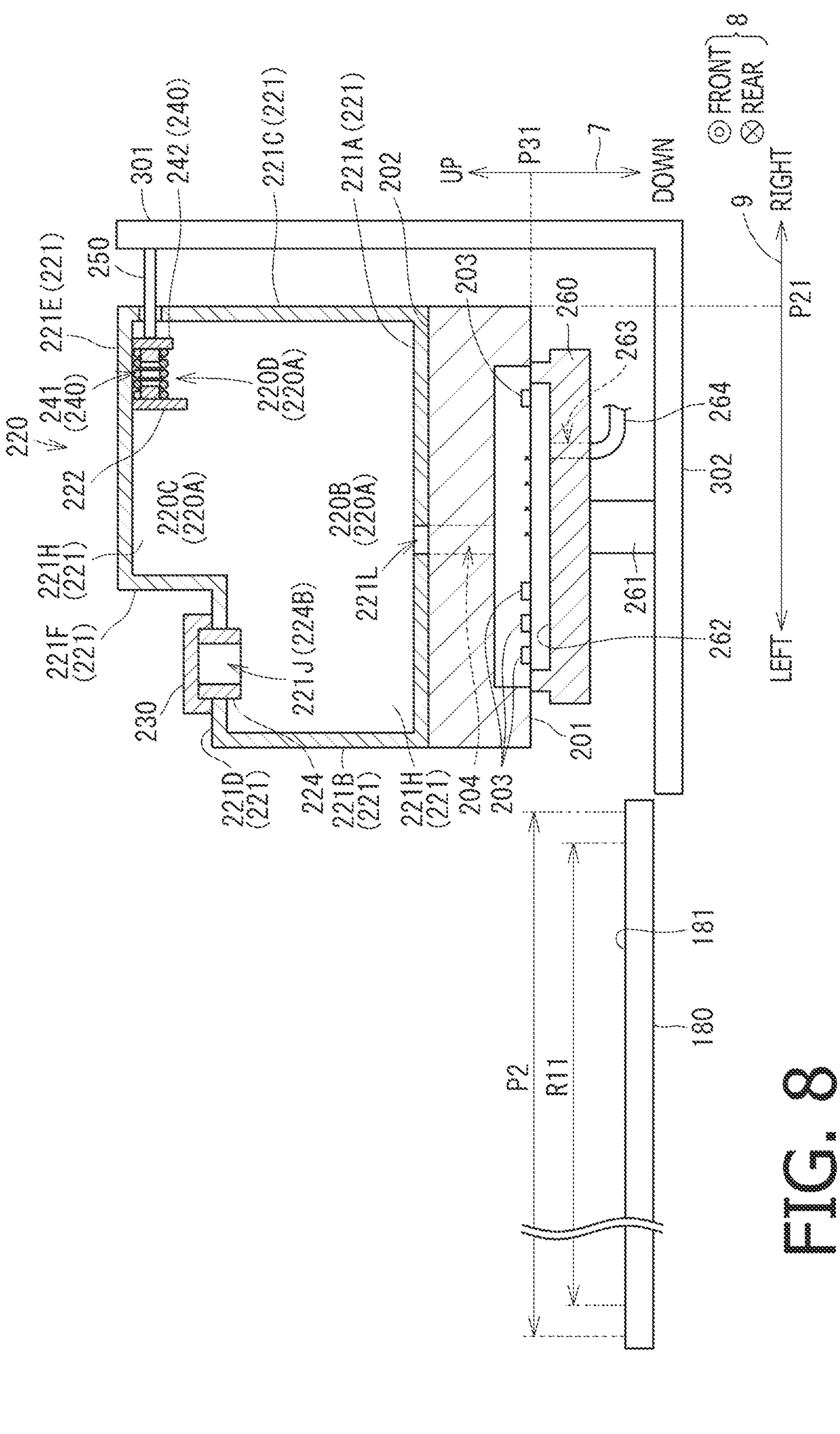

FIG. 8 is an illustrative view of a valve unit 240 with a valve body 242 opening an atmosphere communication path 221K in the printer 100 according to the embodiment of the present disclosure.

Figure 9A:
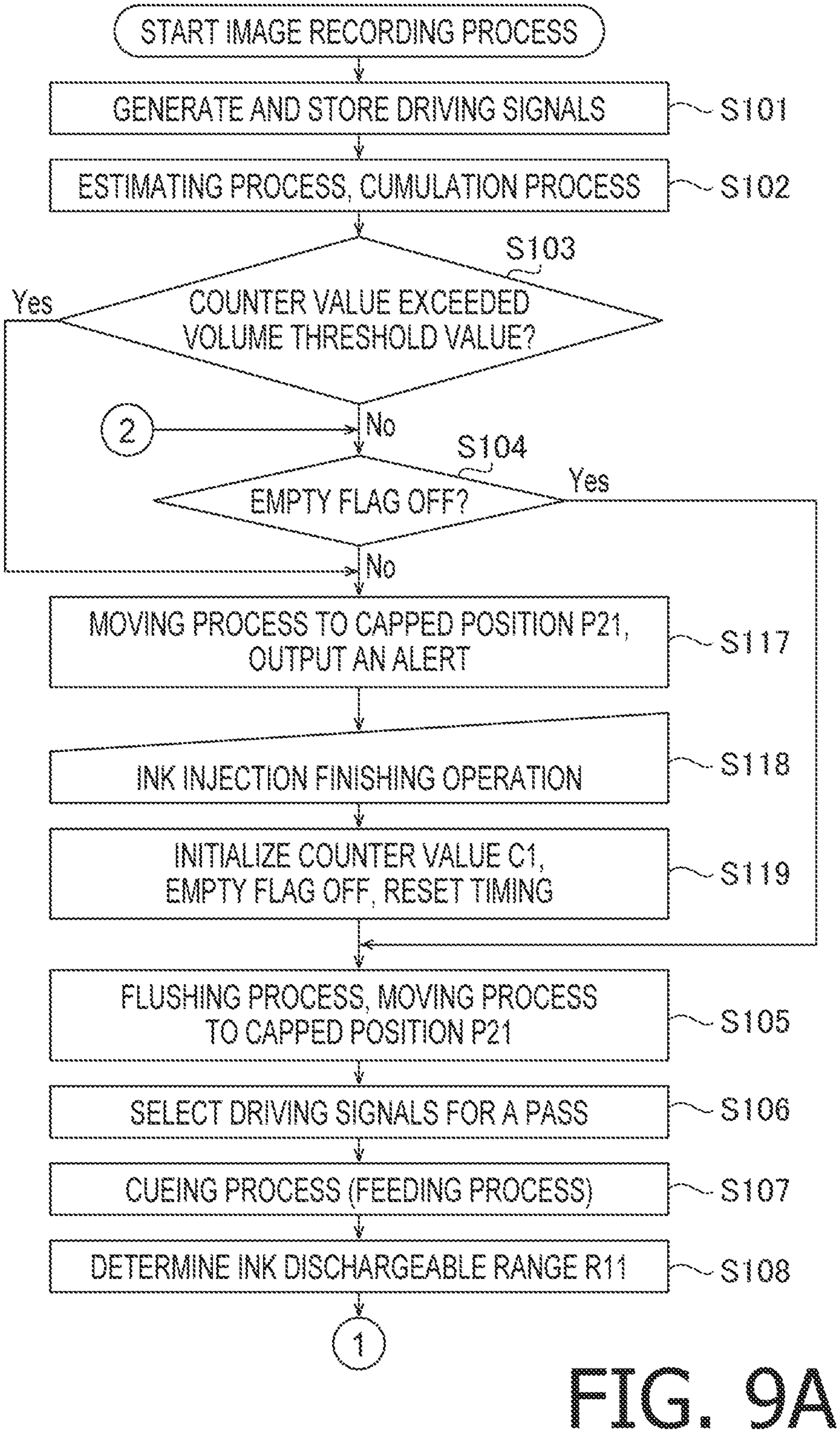
Figure 9B:
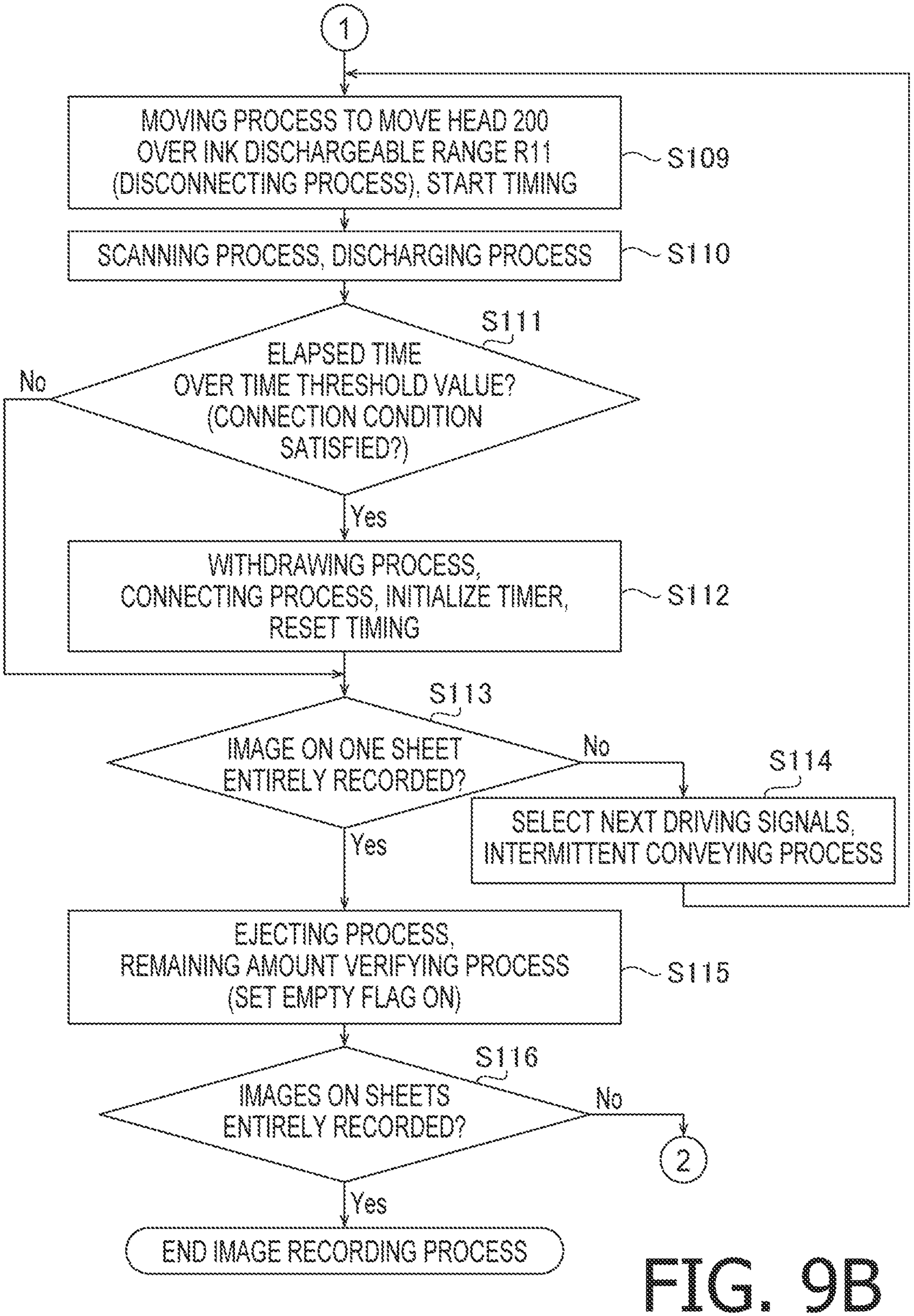

FIGS. 9A-9B are flowcharts to illustrate steps in an image recording process to be conducted in the printer 100 according to the embodiment of the present disclosure.

Figure 10A:
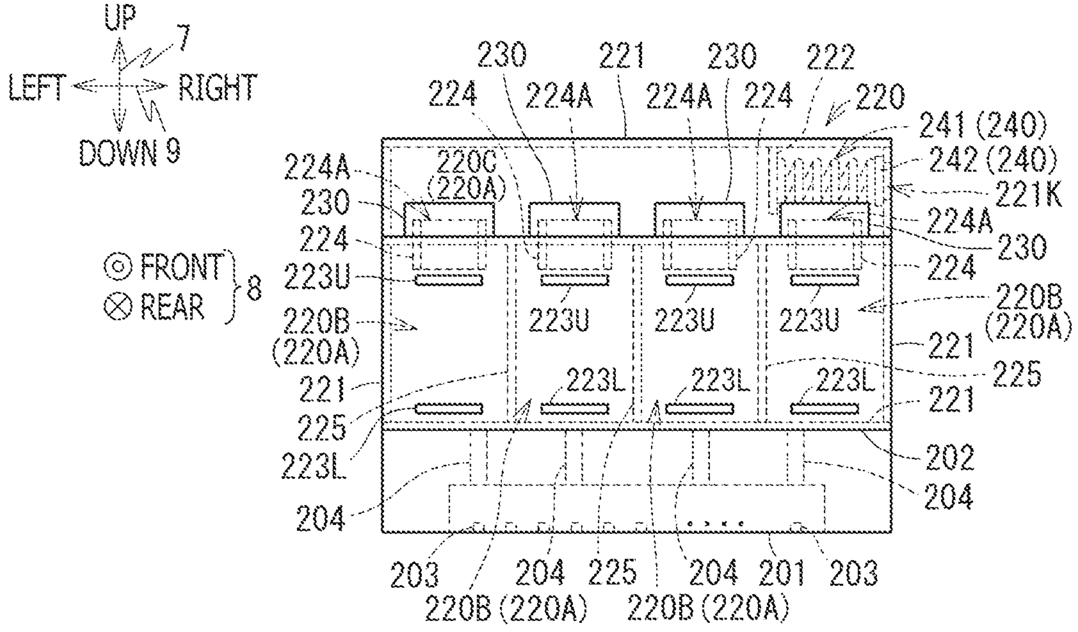
Figure 10B:
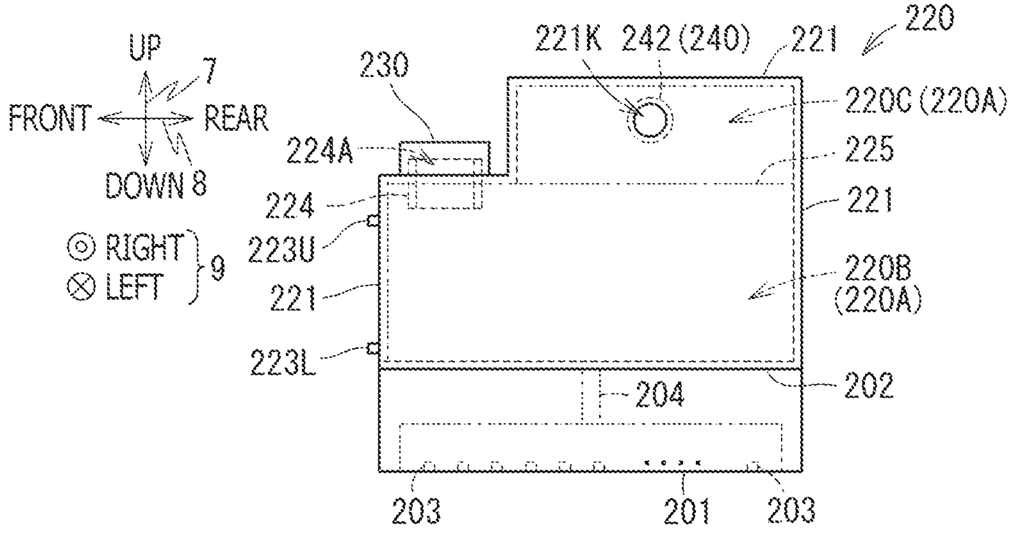

FIGS. 10A-10B are illustrative frontward and rightward views of the reservoir section 220 in a modified example, respectively, according to the embodiment of the present disclosure.

Figure 11A:
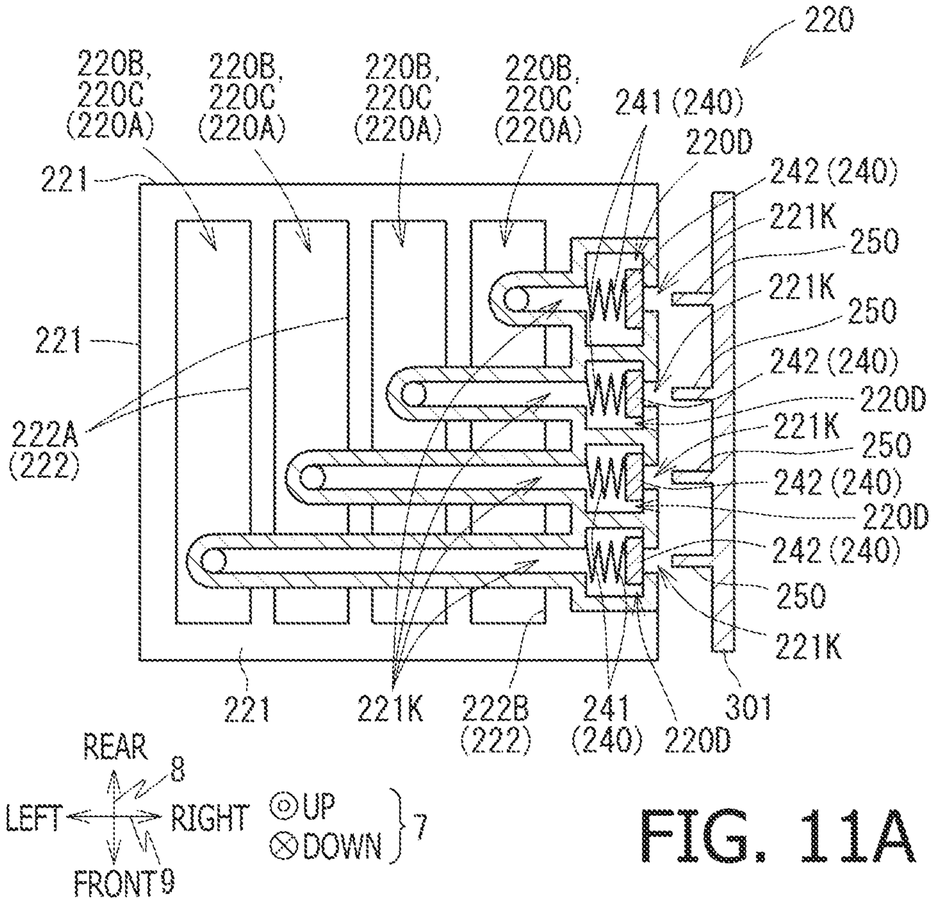
Figure 11B:
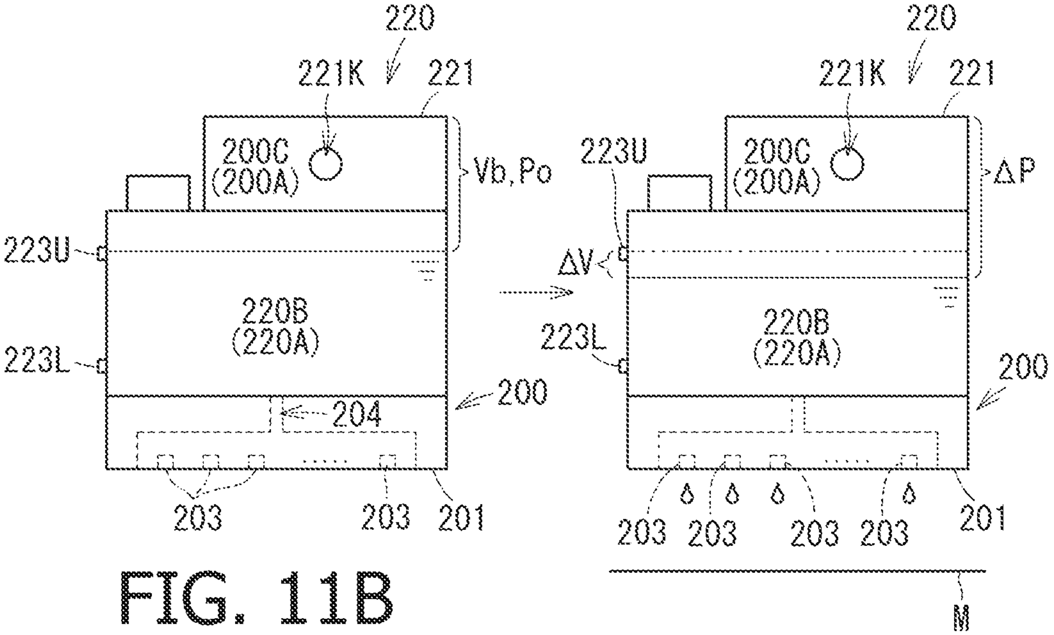

FIG. 11A is an illustrative view of the reservoir section 220 in another modified example according to the embodiment of the present disclosure. FIG. 11B is an illustrative view showing how to determine a volume Vb of an air portion in the reservoir section 220 according to the embodiment of the present disclosure.

Figure 12A:
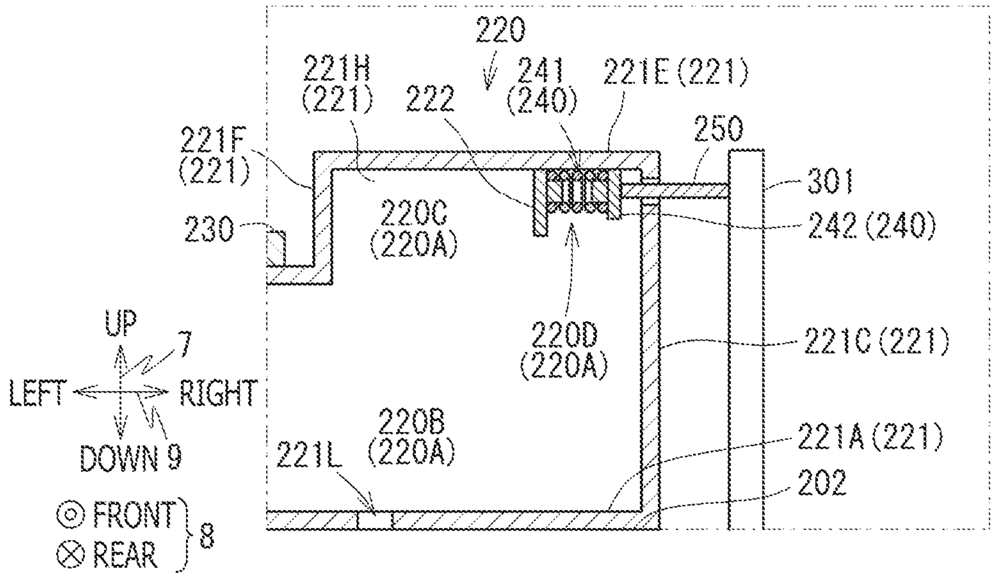
Figure 12B:
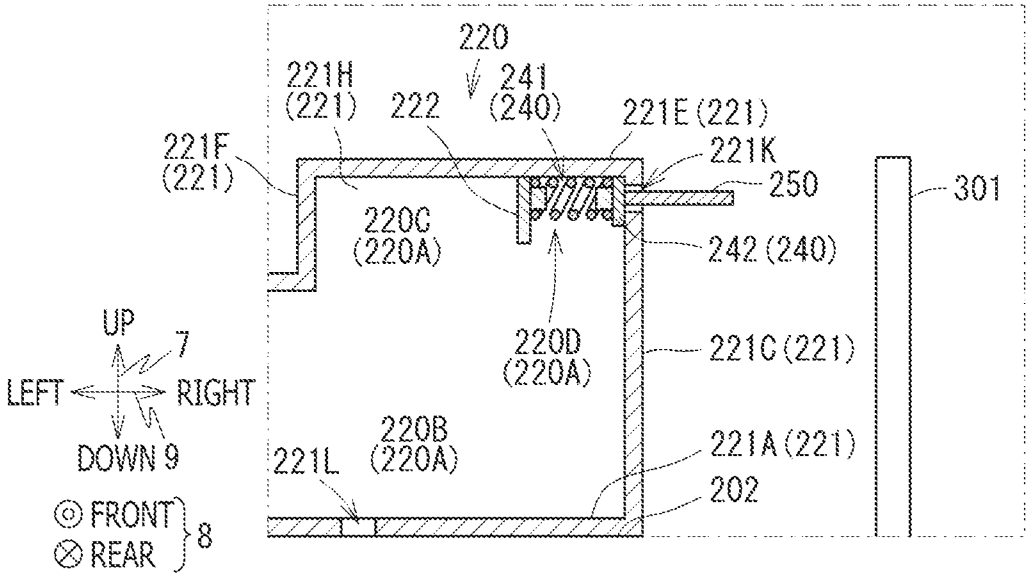

FIGS. 12A-12B illustrate a modified example of an opener member 250, opening and closing an atmosphere communication path 221K, respectively, according to the embodiment of the present disclosure.

Figure 13A:
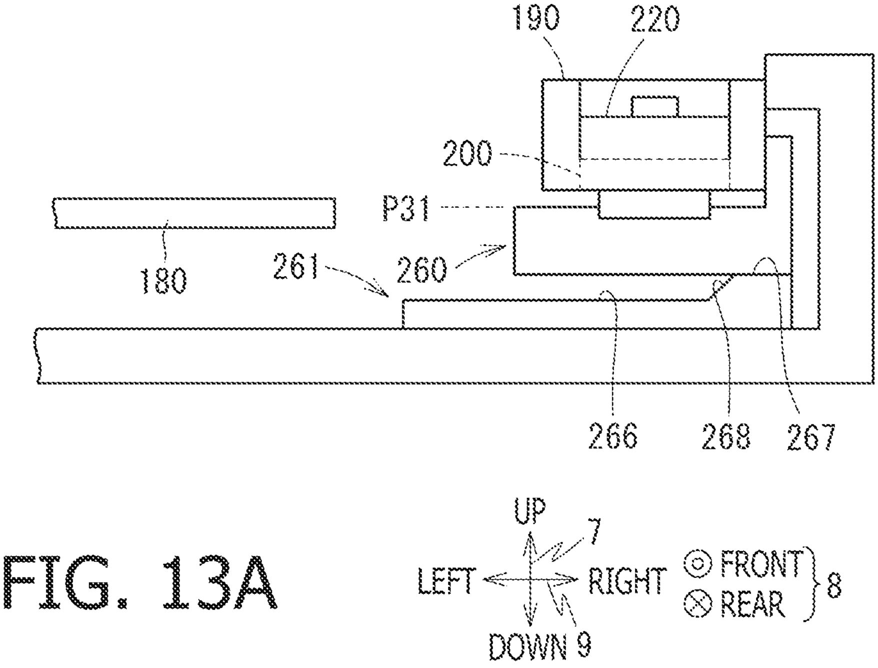
Figure 13B:
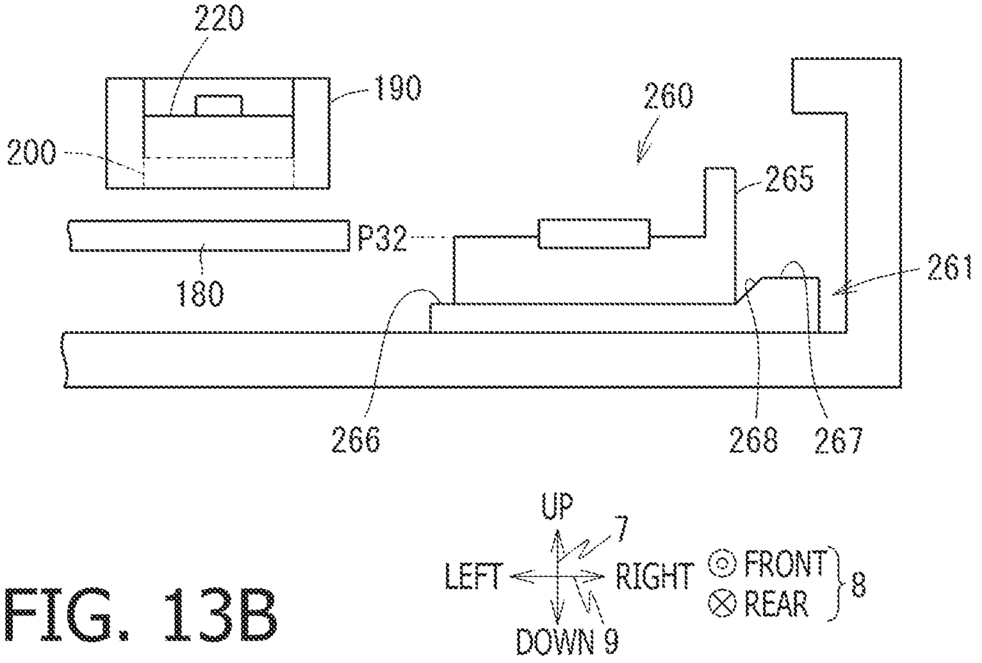

FIGS. 13A-13B illustrate a modified example of a cap 260 at a capping position P31 and an uncapping position P32, respectively, and a lift assembly 261 according to the embodiment of the present disclosure.

DETAILED DESCRIPTION

Embodiment

In the following paragraphs, with reference to the accompanying drawings, an embodiment of the present disclosure will be described. It is noted that various connections may be set forth between elements in the following description. These connections in general and, unless specified otherwise, may be direct or indirect and this specification is not intended to be limiting in this respect. In the following description, for example, duration of a state reaching a threshold value may be explained as an example of satisfying a connection condition. However, the connection condition may be satisfied by different items or events, some of which will be described further below.

In the following description, directivity indicated by a pointing arrow, from a root of a stem toward a pointing head, will be expressed by a term "orientation," whereas back or forth movability along a line extending through a stem and a pointing head of an arrow will be expressed by a term "direction."

Figure 1:
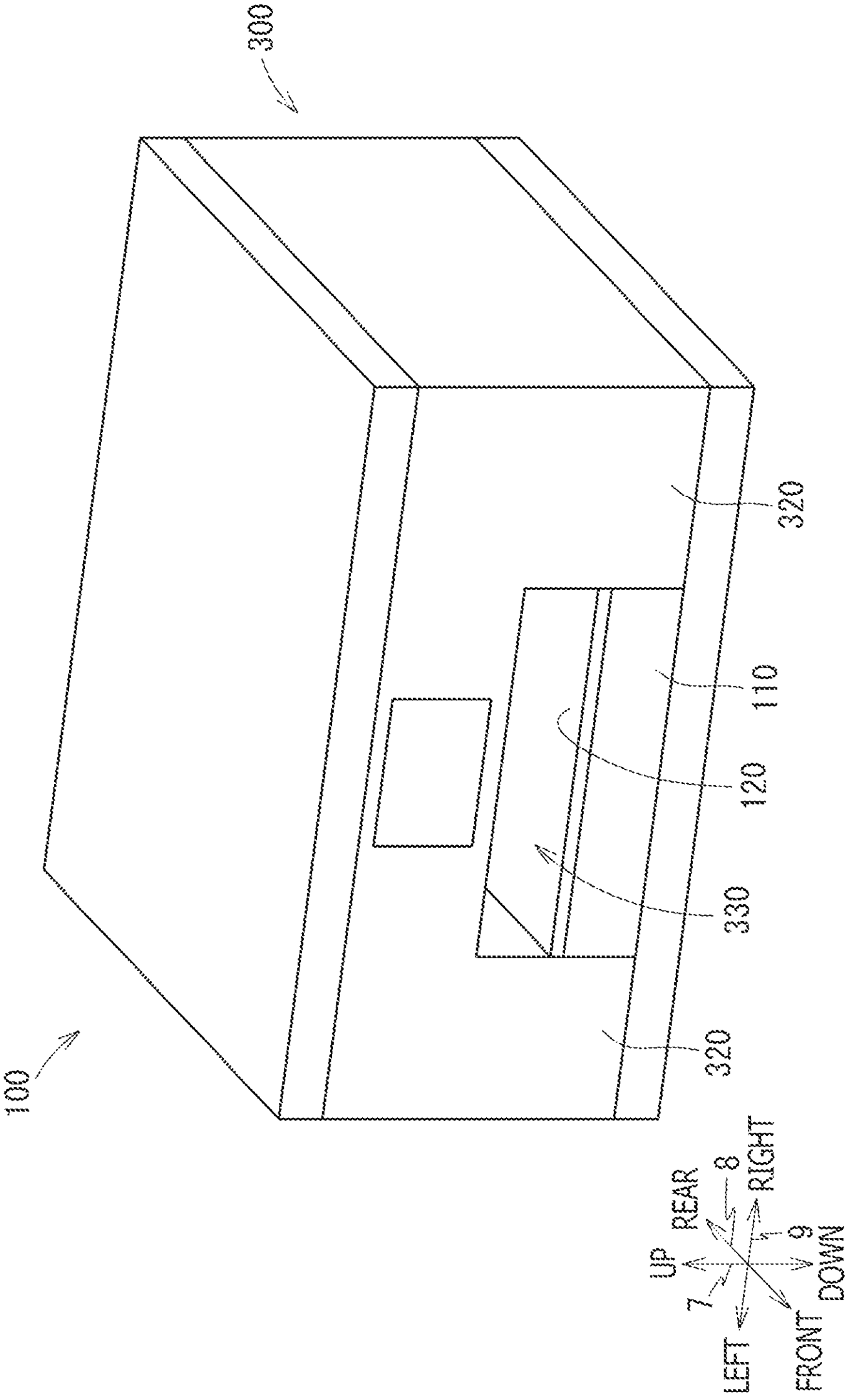
FIG. 1 is an exterior perspective view of a printer 100 according to an embodiment of the present disclosure.

Moreover, positional relation within the printer 100 and each part or item included in the printer 100 will be mentioned on basis of a posture of the printer 100 in an ordinarily usable condition as indicated by the bi-directionally pointing arrows in FIG. 1. For example, a vertical axis between an upper side and a lower side in FIG. 1 is defined as an up-down direction 7. A side, on which an opening 330 is formed, is defined as a front face 320, and an axis between the front side and a rear side opposite from the front side is defined as a front-rear direction 8. A right-hand side and a left-hand side to a user who faces the front face 320 of the printer 100 are defined as a rightward side and a leftward side, respectively. An axis between the rightward side and the leftward side is defined as a right-left direction 9. The up-down direction 7, the front-rear direction 8, and the right-left direction 9 intersect orthogonally to one another. In the following description, the up-down direction 7 and the right-left direction 9 may be referred to as a vertical direction 7 and a widthwise direction 9, respectively.

[Overall Configuration of Printer 100]

The printer 100, as shown in FIG. 1 may record a monochrome image in a single color, e.g., black, on a sheet M (see FIG. 2) in an inkjet recording method. The sheet M may be, for example, a sheet of paper or an OHP film. It may be noted, however, that the method to record the image on the sheet M may not necessarily be limited to inkjet recording but may be in a different recording method such as, for example, thermal-inkjet recording, which is also known as bubblejet (registered trademark) recording.

[Internal Configuration of Printer 100]

Figure 2:
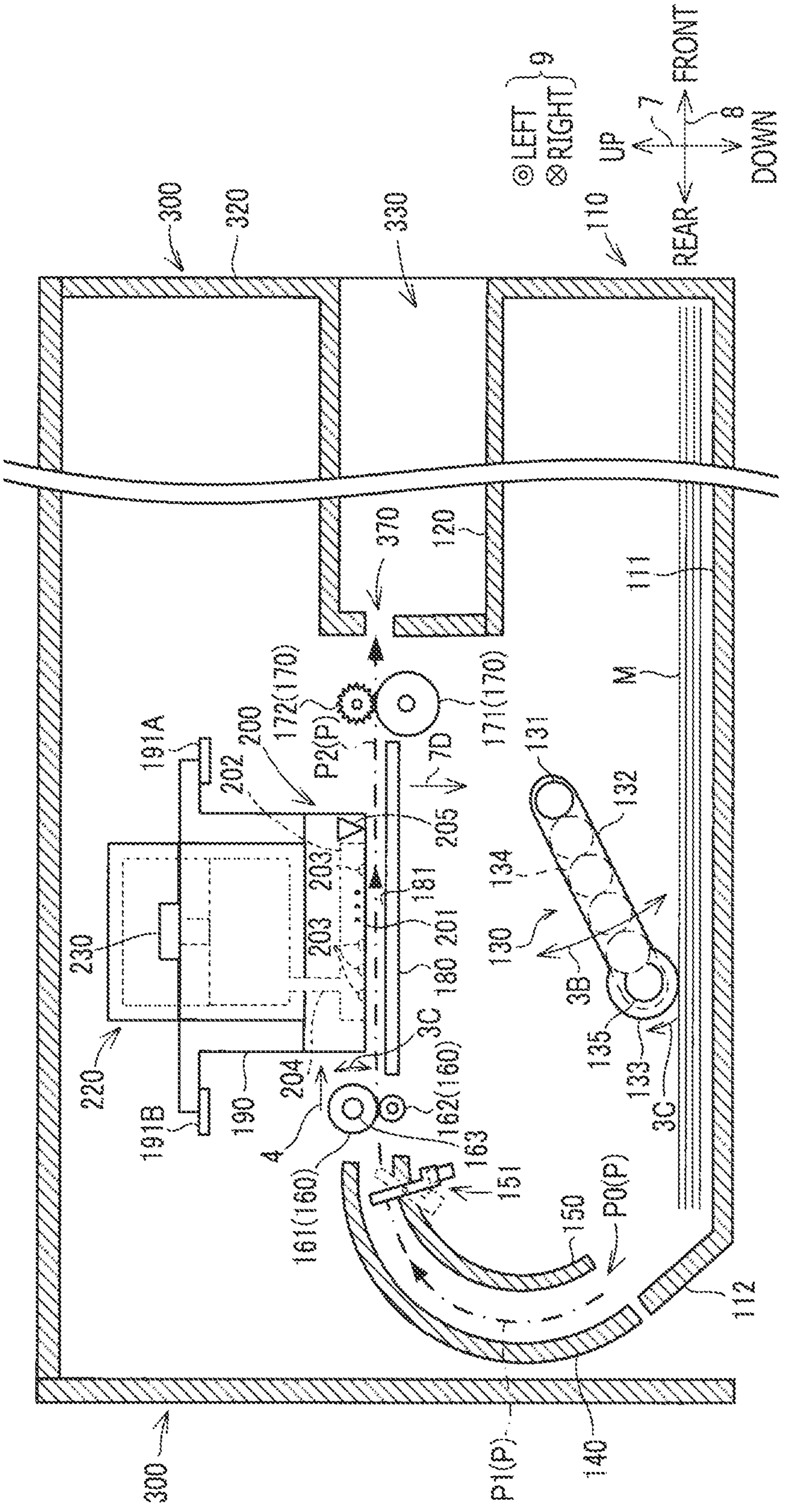
FIG. 2 is a cross-sectional view to illustrate an inner structure of the printer 100 according to the embodiment of the present disclosure.

The printer 100 as shown in FIG. 2 has a feeder tray 110, an ejection tray 120, a feeder 130, an outer guide 140, an inner guide 150, a conveyer roller pair 160, an ejection roller pair 170, a platen 180, a carriage 190, a head 200, a conveyer 210 (see FIG. 3), the reservoir section 220, a lid 230, a valve unit 240 (see FIG. 5), an opener member 250 (see FIG. 5), a cap 260 (see FIG. 5), and a controller 270 (see FIG. 7), which are accommodated in a housing 300.

[Housing 300]

The housing 300 as shown in FIG. 1 may have a shape of an approximately rectangular cuboid. The housing 300 may be supported by frames, which are not shown, arranged inside. On the front face 320, the opening 330 being open frontward is formed.

[Feeder Tray 110]

The feeder tray 110 may be installed in the housing 300 through the opening 330. On a bottom 111 of the feeder tray 110, as shown in FIG. 2, one or more sheets M may be stacked in the vertical direction 7. From a rear end of the bottom 111, a guide member 112 extends upper-rearward to a position closely below a lower end of the outer guide 140.

[Ejection Tray 120]

In the housing 300, at a position above the feeder tray 110, a sheet outlet 370 is formed. Through the sheet outlet 370, the sheet M, on which an image is recorded in the printer 100, may be ejected. The sheet M with the image recorded thereon may be called as a printed material M. The ejection tray 120 is arranged at a lower-frontward position with respect to the sheet outlet 370. The ejection tray 120 may support the printed material M.

[Feeder 130]

The feeder 130 as shown in FIG. 2 includes a shaft 131, a feeder arm 132, a feeder roller 133, and a driving-force transmission assembly 134.

The shaft 131 is supported by a frame, which is not shown, and extends in the widthwise direction 9 at a position above the bottom 111. The feeder arm 132 is supported by the shaft 131 at a basal end part thereof. The feeder arm 132 is pivotable in a circumferential direction 3B of the shaft 131. The feeder arm 132 extends lower-rearward from the basal end part. The feeder roller 133 is attached to a tip end part of the feeder arm 132. The feeder roller 133 is rotatable in a circumferential direction 3C of a shaft 135, which is parallel to the shaft 131. The driving-force transmission assembly 134 may include a gear train and a driving belt and may be arranged inside the feeder arm 132.

Overall behaviors of the feeder 130 are herein described. The feeder roller 133 may contact an uppermost one of the sheets M stacked on the bottom 111 of the feeder tray 110. The driving-force transmission assembly 134 may transmit a force, generated by a feeder motor 271 (see FIG. 8) for feeding the sheets M, to the feeder roller 133. The feeder roller 133 may be rotated by the transmitted force and apply a rearward conveying force to the uppermost sheet M. Thereby, the uppermost sheet M may be conveyed rearward on the bottom 111 and guided by an inclined surface of the guide member 112 to a conveyer path P through a sheet inlet P0.

[Conveyer Path P]

As shown in FIG. 2, inside the housing 300, the conveyer path P to convey the sheet M is formed. The sheet inlet P0 forms an upstream end of the conveyer path P and is arranged above the extended end of the guide member 112. The conveyer path P is a so-called U-turn path and includes a curved path P1 and a linear path P2. The curved path P1 curves substantially upper-frontward from the sheet inlet P0. The linear path P2 extends substantially linearly frontward from a downstream end of the curved path P1 to the sheet outlet 370.

[Outer Guide 140, Inner Guide 150]

The outer guide 140 and the inner guide 150 delimit an outermost part and an innermost part of the curved path P1, respectively.

Conveyance of the sheet M is herein described. The sheet M fed to the sheet inlet P0 may be guided by the outer guide 140 and the inner guide 150 to be conveyed there-along. Thereafter, the sheet M may be passed to the conveyer roller pair 160.

[Registration Sensor 151]

On the inner guide 150 at a registration position, which is in proximity to a downstream end of the curved path P1, a registration sensor 151 is arranged. The registration sensor 151 is supported by the inner guide 150 and extends inside the curved path P1. The registration sensor 151 may swing in a conveying orientation 4, which is an orientation of the sheet M being conveyed in the curved path P1, and in a reverse orientation. The sheet M being conveyed in the curved path P1 may contact the registration sensor 151. The registration sensor 151 may output different-leveled signals depending on whether the sheet M is in contact with the registration sensor 151 or the sheet M is not in contact with the registration sensor 151 to the controller 270 (see FIG. 7). The different-leveled signals from the registration sensor 151 may be hereinafter called as registration signals V13.

[Conveyer Roller Pair 160]

The conveyer roller pair 160 includes a driving roller 161 and a pinch roller 162. The driving roller 161 and the pinch roller 162 are arranged to contact each other in the vertical direction 7 across a downstream end part of the curved path P1 and extend in the widthwise direction 9 along the downstream end part of the curved path P1. The driving roller 161 in the present embodiment contacts the pinch roller 162 from above. Optionally, however, the driving roller 161 may contact the pinch roller 162 from below.

The driving roller 161 may rotate by a force generated by a conveyer motor 272 (see FIG. 7) for conveying the sheets M. The pinch roller 162 may be rotated by the rotation of the driving roller 161. The driving roller 161 and the pinch roller 162 may nip the sheet M and rotate to convey the sheet M in a conveying orientation 4, e.g., frontward. Thereby, the sheet M may be conveyed downstream in the linear path P2.

[Ejection Roller Pair 170]

As shown in FIG. 2, the ejection roller pair 170 includes a driving roller 171 and a spur roller 172. The driving roller 171 and the spur roller 172 are located at a position between the platen 180 and the sheet outlet 370 in the linear path P2 across the linear path P2 to contact each other in the vertical direction 7 and extend in the widthwise direction 9 along the linear path P2. The spur roller 172 in the present embodiment contacts the driving roller 171 from above. Optionally, however, the spur roller 172 may contact the driving roller 171 from below.

The driving roller 171 may rotate by the force generated by the conveyer motor 272. The spur roller 172 may be rotated by the rotation of the driving roller 171. The driving roller 171 and the spur roller 172 may nip the sheet M and rotate to convey the sheet M further downstream in the conveying orientation 4. Thereby, the sheet M may be ejected outside through the sheet outlet 370.

[Platen 180]

The platen 180 is located between the conveyer roller pair 160 and the ejection roller pair 170 in the front-rear direction 8. The platen 180 has a supporting surface 181 spreading in the front-rear direction 8 and the widthwise direction 9. The supporting surface 181 delimits a lowermost part of the linear path P2 and may support the sheet M conveyed by the conveyer roller pair 160 from below. The supporting surface 181 may be formed of upper-end faces of a plurality of ribs protruding upward from the platen 180 and longitudinally extending in the front-rear direction 8. Optionally, however, the supporting surface 181 may be a plain upper surface of the platen 180. The platen 180 may be colored in, for example, black, or a color which may absorb light emitted from the sheet sensor 205.

[Carriage 190]

Figure 3:
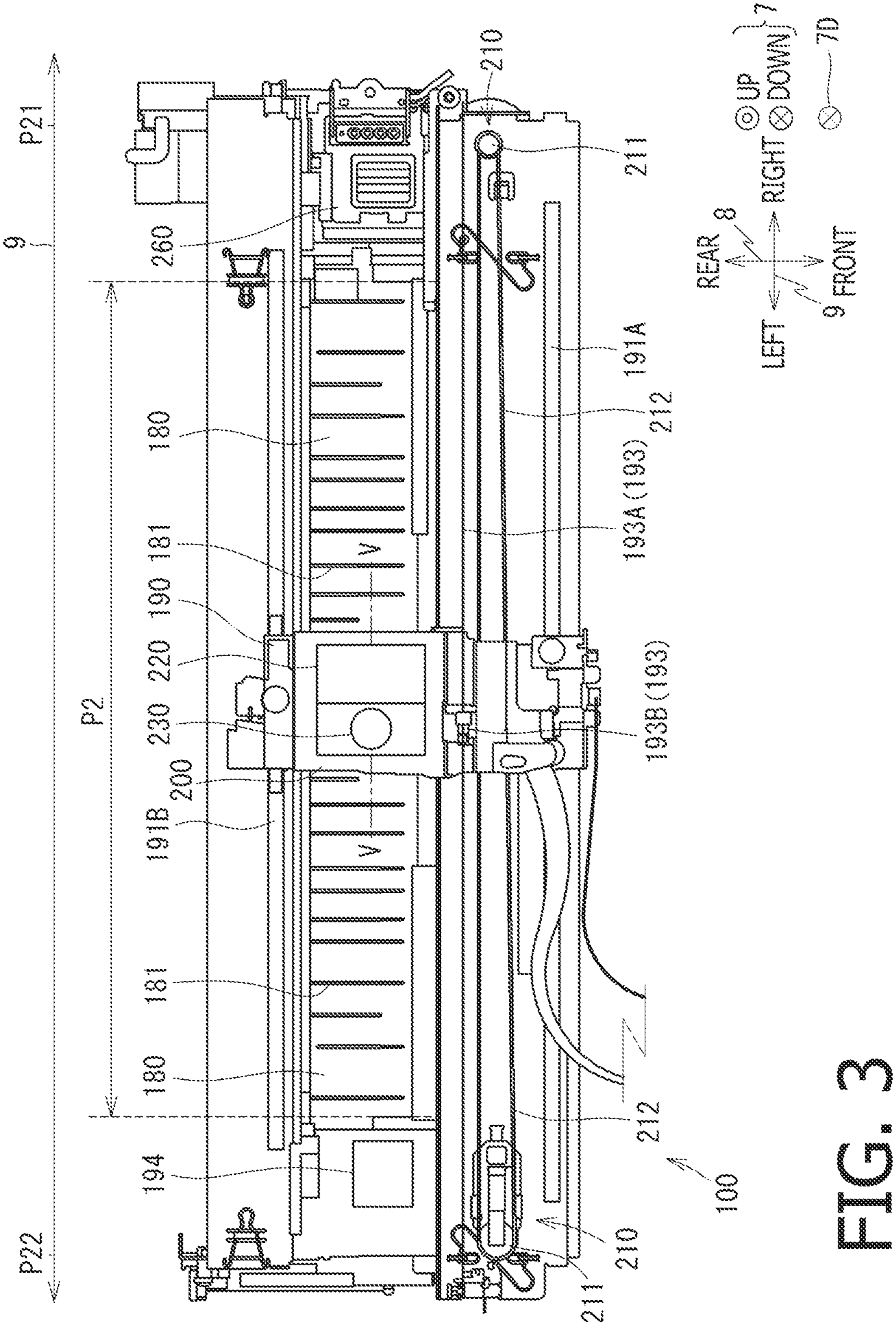
FIG. 3 is a top plan view showing an area in the inner structure, including a reservoir section 220 and a neighboring structure, according to the embodiment of the present disclosure.

The printer 100 as shown in FIGS. 2-3 further has guide rails 191A, 191B arranged inside the housing 300. As shown in FIG. 2, the guide rails 191A, 191B are located at higher positions with respect to the supporting surface 181 and are supported by a frame, which is not shown. In a top plan view, as shown in FIG. 3, the guide rails 191A, 191B are arranged to be spaced apart in the front-rear direction 8 to flank the supporting surface 181 and longitudinally extend in the widthwise direction 9. In other words, between the guide rails 191A, 191B in the front-rear direction 8, the supporting surface 181 of the platen 180 is located.

The carriage 190, as shown in FIG. 3, has a width smaller than a width of the platen 180 and is arranged over the guide rails 191A, 191B in the front-rear direction 8. The carriage 190 may move on the guide rails 191A, 191B by the force transmitted through the conveyer 210 to reciprocate in the widthwise direction 9. In the following paragraphs, the direction in which the carriage 190 is movable may be called as a scanning direction 9.

[Head 200]

The head 200 as shown in FIG. 2 has a lower face 201, an upper face 202, a plurality of nozzles 203, and ink flow path 204. The plurality of nozzles 203 are formed to align along the front-rear direction 8 and the widthwise direction 9 on the lower face 201. In FIG. 2, among the plurality of nozzles 203, merely nozzles 203 aligning along the front-rear direction 8 are shown. Each nozzle 203 has a downward discharging opening. The head 200 is mounted on the carriage 190 so that the lower face 201 of the head 200 may move in the scanning direction 9 along with the carriage 190 in a position separated above from the supporting surface 181. In this regard, the lower face 201 delimits an uppermost part of the linear path P2.

The head 200 accommodates piezoelectric devices (not shown), which correspond to the nozzles 203 on one-to-one basis. Driving waveforms modulated by the controller 270 may be applied to the piezoelectric devices in the head 200, and thereby the head 200 may discharge the ink and consume the ink stored therein through the nozzles 203 in a discharging orientation 7D, i.e., downward.

[Conveyer 210 (a Part of Switching Assembly)]

The conveyer 210 as shown in FIG. 3 includes two (2) pulleys 211 and an endless belt 212. The conveyer 210 forms a part of the switching assembly and may switch states of a valve body 242, which will be described further below, between an opening state and a closing state. The pulleys 211 are separated on the guide rail 191A from each other in the widthwise direction 9. Each pulley 211 may rotate in a circumferential direction of an axis thereof, which extends along the vertical direction 7. The endless belt 212 is strained around the pulleys 211 and is coupled to the carriage 190. One of the pulleys 211, e.g., the pulley 211 on the right, is coupled to a carriage motor 273 (see FIG. 7) for driving the carriage 190. The carriage motor 273 may operate under control of the controller 270 and generate a driving force. The pulley 211 on the right may be driven by the driving force from the carriage motor 273 to rotate in either a normal direction or a reverse direction. Therefore, the head 200 coupled to the endless belt 212 may reciprocate in the widthwise direction 9 between a capped position P21 and a flushing position P22, which are set in advance between the pulleys 211. The capped position P21 may be at substantially the same position in the widthwise direction 9 as the cap 260, which is separated rightward from the platen 180 and leftward from a frame 301 (see FIG. 5). The flushing position P22 is separated leftward from the platen 180. An ink receiver 194 is arranged at the flushing position P22.

The head 200 may move above an ink dischargeable range R11 (see FIG. 8), which will be described further below, while the carriage 190 moves leftward or rightward in a swath or a pass under the control of the controller 270. The head 200 and the reservoir chamber 220B are connected through the ink flow path 204 allowing the liquid to flow therein. While moving in the widthwise direction 9, the head 200 may discharge the ink supplied through the ink flow path 204 from the reservoir section 220. In other words, a line of image for a pass may be recorded on the sheet M.

[Linear Encoder 193]

As shown in FIG. 3, a linear encoder 193 is arranged on the guide rail 191A and the carriage 190. The linear encoder 193 includes an encoder strip 193A and an optical sensor 193B. The encoder strip 193A is arranged on the guide rail 191A between the endless belt 212 and the platen 180 in the front-rear direction 8. The encoder strip 193A extends in the widthwise direction 9 between the capped position P21 and the flushing position P22. The encoder strip 193A thereon has a pattern, in which light-transmissive portions that transmit light and light-blocking portions that block light are alternately arranged at equal intervals along the widthwise direction 9. The optical sensor 193B has a light-emitting device and a light-receiving device, which are arranged to face each other across the encoder strip 193A. The light-emitting device may emit light at the encoder strip 193A while the carriage 190 is being moved. The light-receiving device may receive the light from the light-emitting device and output different-leveled signals depending on an amount of the received light to the controller 270. The different-leveled signals from the linear encoder 193 may be hereinafter called as pulse signals V15 (see FIG. 7). Based on the pulse signals V15, the controller 270 may determine a position of the head 200 in the widthwise direction 9.

[Sheet Sensor 205]

On the lower face 201 of the head 200, as shown in FIG. 2, a sheet sensor 205 is arranged. The sheet sensor 205 being an optical sensor is arranged at a position on the linear path P2 in proximity to a front end of the lower face 201 to face the supporting surface 181 of the platen 180. The sheet sensor 205 has a light-emitting device and a light-receiving device. The light-emitting device may emit a predetermined amount of light downward at the supporting surface 181 while the head 200 is being moved. The light-receiving device may output different-leveled signals depending on an amount of received light to the controller 270. The different-leveled signals from the sheet sensor 205 may be hereinafter called as sheet signals V16 (see FIG. 7). In the present embodiment, when the light is emitted from the light-emitting device of the sheet sensor 205 at the sheet M on the platen 180, the light may be reflected on the sheet M, and a part of the reflected light may enter the light-receiving device. On the other hand, when the light is emitted from the light-emitting device of the sheet sensor 205 at the platen 180, the light may be absorbed in the platen 180. Thus, the sheet signals V16 may indicate presence or absence of the sheet M on the supporting surface 181 at the position straight below the sheet sensor 205. In the paragraphs below, the position straight below the sheet sensor 205 may be called as a cueing position.

[Reservoir Section 220, Lid 230]

Figure 4:
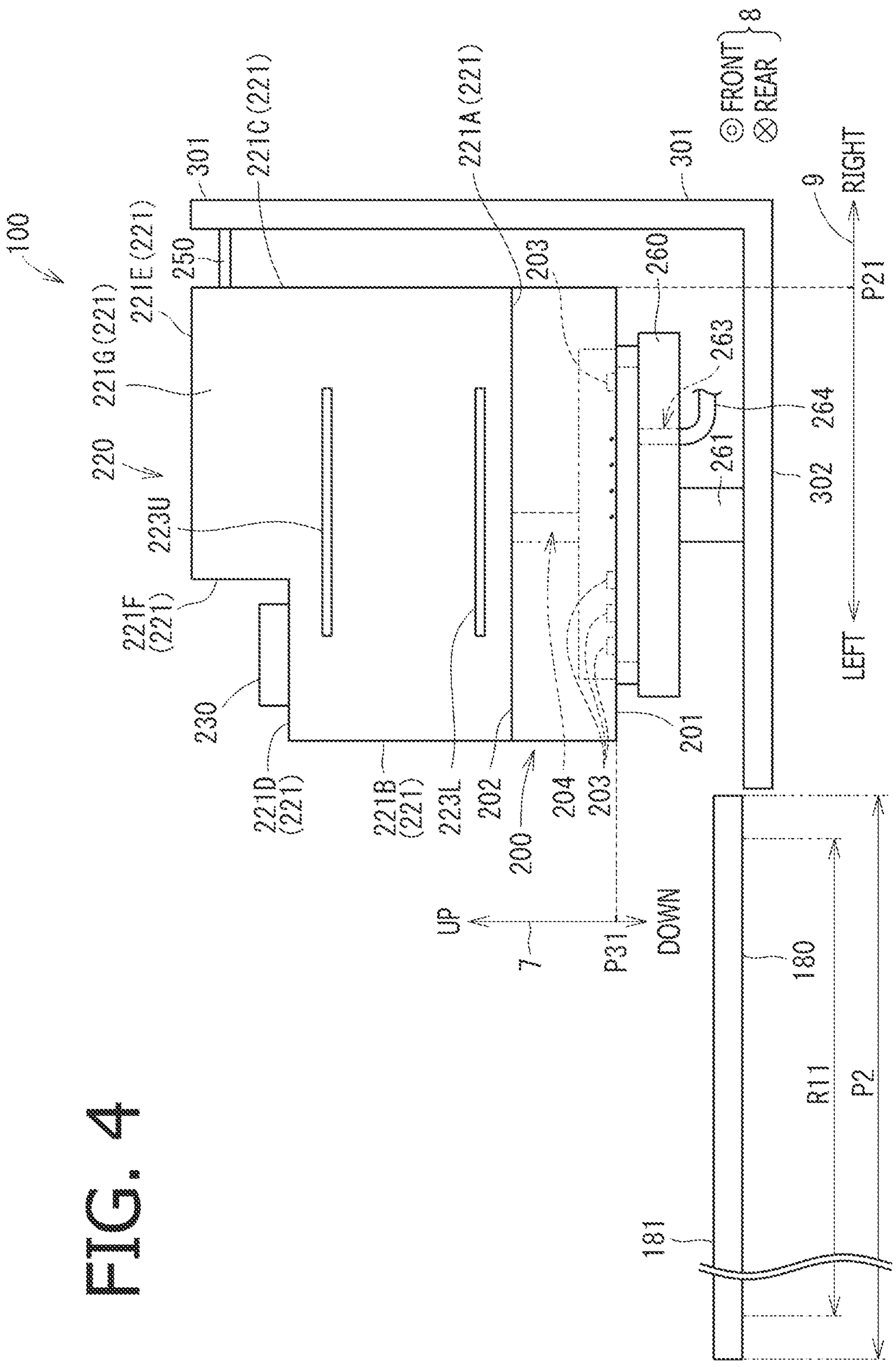
FIG. 4 is an illustrative view of the reservoir section 220 and the neighboring structure viewed from a front side, when a head 200 is located at a capped position P21, according to the embodiment of the present disclosure.
Figure 5:
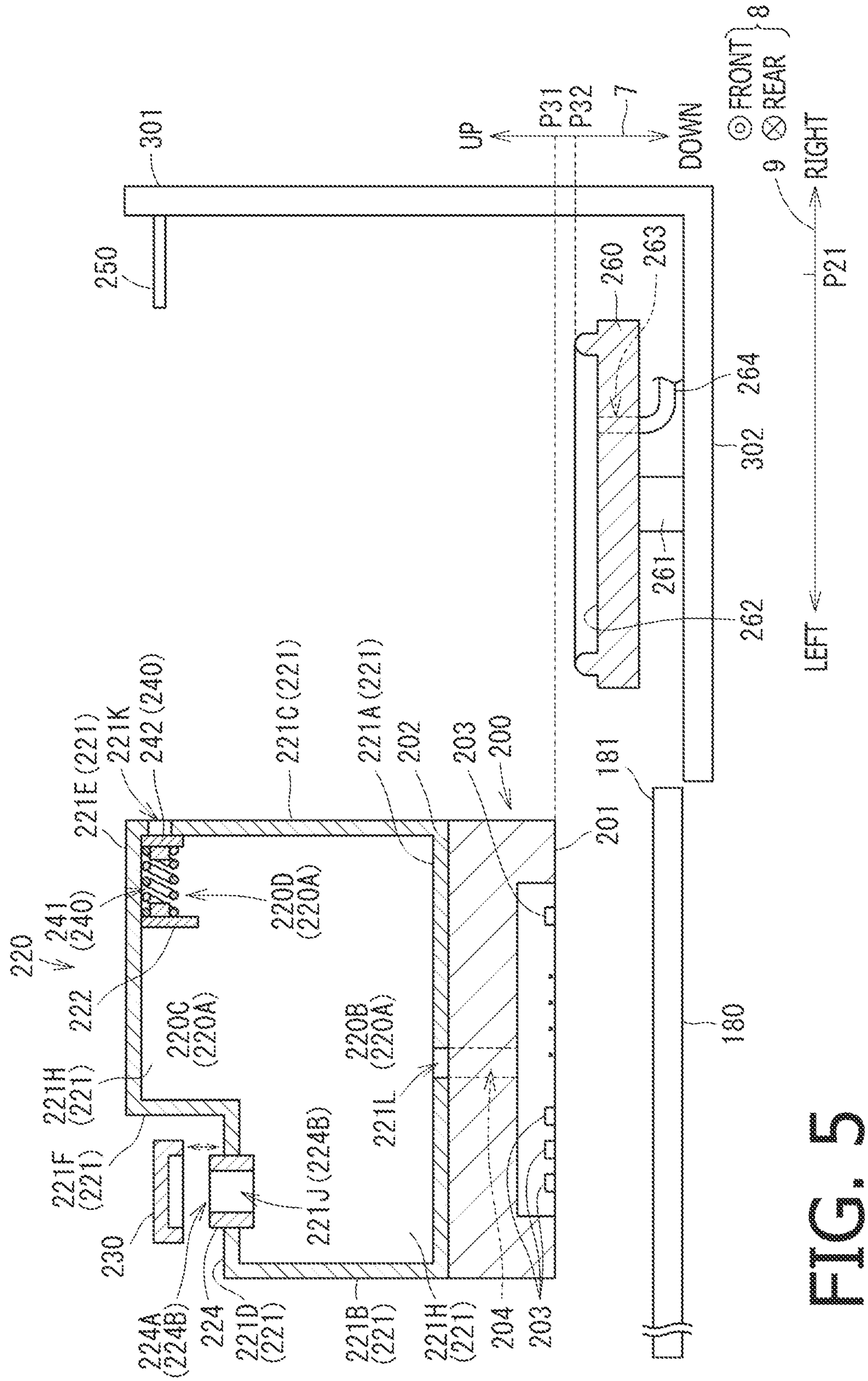
FIG. 5 is a cross-sectional view of the reservoir section 220 and the neighboring structure, sectioned at a dash-and-dot line V-V indicated in FIG. 3 and viewed from the front side, when the head 200 is separated from the capped position P21, according to the embodiment of the present disclosure.

The reservoir section 220, as shown in FIGS. 4-5, being an ink tank is attached to the upper face 202 of the head 200 so that the reservoir section 220 may not be detached from the head 200 easily. In other words, the printer 100 in the present embodiment may be a so-called on-carriage printer, in which the reservoir section 220 and the head 200 are mounted on the carriage 190. The reservoir section 220 may be located entirely at an upper position with respect to the head 200. Optionally, however, the reservoir section 220 may be at least partly located above the upper face 202 of the head 200, and another part of the reservoir section 220 may be located below the upper face 202 of the head 200.

The reservoir section 220 may store ink therein. A color of the ink may be, for example, black. The ink in the reservoir section 220 may be supplied to the head 200 through an outflow port 221L and the ink flow path 204. The reservoir section 220 has, as shown in FIG. 4, an outer wall 221, an upper index 223U, and a lower index 223L. Moreover, the reservoir section 220 has, as shown in FIG. 5, a divider wall 222 and a cylindrical wall 224.

As shown in FIG. 5, the outer wall 221 delimits an inner space 220A of the reservoir section 220 from an external surrounding. The reservoir section 220 may be mainly made of a translucent material, e.g., transparent resin. Therefore, a user may visually recognize an amount of the ink stored in the reservoir section 220.

The outer wall 221 includes a bottom wall 221A, a first left-side wall 221B, a right-side wall 221C, a first upper wall 221D, a second upper wall 221E, a second left-side wall 221F, a front wall 221G (see FIG. 4), and a rear wall 221H (see FIG. 5). The bottom wall 221A, the first upper wall 221D, and the second upper wall 221E are in substantially rectangular forms in a plan view along the vertical direction 7. The first left-side wall 221B, the second left-side wall 221F, and the right-side wall 221C are substantially in rectangular forms in a view along the widthwise direction 9.

The bottom wall 221A spreads on the upper face 202 of the head 200. A frontward edge and a rearward edge of the bottom wall 221A are substantially parallel to the front-rear direction 8, and a leftward edge and a rightward edge of the bottom wall 221A are substantially parallel to the widthwise direction 9.

The first left-side wall 221B and the right-side wall 221C extend upward from the leftward edge and the rightward edge of the bottom wall 221A, respectively. An extended end, i.e., an upper end, of the first left-side wall 221B is located to be lower than an extended end of the right-side wall 221C.

The first upper wall 221D spreads between the upper end of the first left-side wall 221B and an intermediate position, which is between the first left-side wall 221B and the right-side wall 221C. The second upper wall 221E spreads between an upper end of the right-side wall 221C and a position separated above from an extended end, or a rightward end, of the first upper wall 221D.

As shown in FIG. 5, in the first upper wall 221D, a through hole 221J, through which the ink may be injected into the reservoir section 220, is formed through the first upper wall 221D in the vertical direction 7.

As shown in FIGS. 4-5, the second left-side wall 221F spreads between a rightward edge of the first upper wall 221D and a leftward edge of the second upper wall 221E.

The front wall 221G (see FIG. 4) and the rear wall 221H (FIG. 5) close the front end and the rear end of the reservoir section 220, respectively.

As shown in FIG. 5, the divider wall 222 delimits the inner space 220A, together with the outer wall 221, into an ink reservoir chamber 220B, an air chamber 220C, and a valve placement space 220D.

The divider wall 222 extends downward from the second upper wall 221E at a position separated leftward from the right-side wall 221C and spreads in the vertical direction 7 and the front-rear direction 8. The divider wall 222 extends to a position lower than a lower end of the atmosphere communication path 221K.

The ink reservoir chamber 220B is a space enclosed by the bottom wall 221A, the first left-side wall 221B, the right-side wall 221C, the first upper wall 221D, the front wall 221G, and the rear wall 221H. The ink reservoir chamber 220B may store the ink.

The air chamber 220C is a space enclosed by the right-side wall 221C, the second upper wall 221E, the second left-side wall 221F, the front wall 221G, and the rear wall 221H. The air chamber 220C is located at an upper position with respect to the upper index 223U. The air may be drawn into the air chamber 220C. Optionally, the air chamber 220C may be a so-called labyrinth flow path delimited by another divider wall(s).

The valve placement space 220D is a space delimited by the second upper wall 221E, the right-side wall 221C, and the divider wall 222 and accommodates the valve unit 240. A lower side of the valve placement space 220D is open downward. Therefore, an atmosphere communication path 221K is connected with the air chamber 220C through the valve placement space 220D.

As shown in FIG. 4, the upper index 223U is arranged on an outer surface of the front wall 221G at a position in proximity to the upper edge of the front wall 221G and has a linear form extending in the widthwise direction 9. The upper index 223U may be a sign indicating a surface level of a maximum amount of the ink storable in the ink reservoir chamber 220B.

The lower index 223L is arranged on the outer surface of the front wall 221G at a position in proximity to the lower edge of the front wall 221G and has a linear form extending in the widthwise direction 9. The lower index 223L may be a sign indicating a surface level of the ink, at which the ink reservoir chamber 220B should be refilled with the ink.

The upper index 223U and the lower index 223L may be marked by engraving, embossing, or painting in a colorant.

As shown in FIG. 5, the cylindrical wall 224 cylindrically extends upward and downward from a circumferential edge of the through hole 221J in the first upper wall 221D. The cylindrical wall 224 has an injection port 224A at an upper end thereof. In other words, an upper end of the cylindrical wall 224 forms an injection port 224A. The injection port 224A is an opening open upward, or outward from the reservoir section 220. An inner circumferential surface of the cylindrical wall 224 delimits an ink supplying path 224B, which continues from the injection port 224A through the through hole 221J to the ink reservoir chamber 220B. In other words, the injection port 224A is continuous with the ink reservoir chamber 220B.

The lid 230 shown in FIGS. 4-5 may be formed of, for example, flexible resin. The lid 230 may be attached to and detached from an upper end of the cylindrical wall 224 by the user to close and open the injection port 224A. The lid 230 may deform when being attached to or detached from the cylindrical wall 224 by the user.

The atmosphere communication path 221K is formed in the right-side wall 221C at a position coincident with the divider wall 222 in the widthwise direction 9. The atmosphere communication path 221K is a through hole formed through the right-side wall 221C in the widthwise direction 9. The atmosphere communication path 221K connects the inside of the ink reservoir chamber 220B and the outside of the reservoir section 220 through the air chamber 220C and the valve placement space 222D. The atmosphere communication path 221K is formed at an upper position with respect to the injection port 224A.

The outflow port 221L is a through hole formed vertically through the bottom wall 221A and is continuous with the ink flow path 204. The air chamber 220C is at least partly located at an upper position with respect to the outflow port 221L. In other words, the air chamber 220C may be located to be higher entirely than the outflow port 221L, or at least a part of the air chamber 220C may be located to be higher than the outflow port 221L.

[Liquid Amount Sensor 216]

As shown in FIGS. 6A-6B, the reservoir section 220 includes a protrusive portion 221M, which protrudes rearward from the rear wall 221H. The protrusive portion 221M is formed of, for example, translucent resin and has a shape of an approximately rectangular cuboid. As shown in FIG. 6A, the protrusive portion 221M extends in the vertical direction 7 from a lower position with respect to the lower index 223L to an upper position with respect to the lower index 223L. As shown in FIG. 6B, the protrusive portion 221M has a form thinned in the widthwise direction 9. The protrusive portion 221M delimits a space, which is continuous with the ink reservoir chamber 220B.

The printer 100 has the liquid amount sensor 216 being an optical sensor. A light-emitting device in the liquid amount sensor 216, arranged on a rightward side of the protrusive portion 221M, may emit light at a position substantially equal to the lower index 223L in the vertical direction 7 in a direction substantially parallel to the widthwise direction 9. A light-receiving device in the liquid amount sensor 216 is arranged on a leftward side of the protrusive portion 221M to face toward the light-emitting device across the protrusive portion 221M and may output different-leveled signals depending on an amount of received light to the controller 270. The different-leveled signals from the liquid amount sensor 216 may be hereinafter called as liquid amount signals V12 (see FIG. 7). In particular, the level of the liquid amount signal V12 when the light-receiving device receives the light transmitted through the protrusive portion 221M and the level of the liquid amount signal V12 when the light-receiving device does not receive the light through the protrusive portion 221M are different.

[Valve Unit 240, Opener member 250 (Part of Switching Assembly)]

As shown in FIG. 5, the valve unit 240 has a spring 241 and the valve body 242.

The spring 241 may be a compressive coil spring, of which natural length is substantially equal to or larger than a distance between the right-side wall 221C and the divider wall 222 in the widthwise direction 9. The spring 241 is accommodated in the valve placement space 220D with an axis thereof aligning in parallel with the widthwise direction 9. A leftward end of the spring 241 is fixed to the divider wall 222. To a rightward end of the spring 241, the valve body 242 is fixed.

The valve body 242 is located at an upper position with respect to the injection port 224A. The valve body 242 may, when the opener member 250 is not contacting the valve body 242, with an inner surface of the right-side wall 221C serving as a valve seat, close the atmosphere communication path 221K by an urging force of the spring 241. Thereby, the atmosphere communication path 221K is placed in a disconnecting state, in which the ink reservoir chambers 220B and the outside of the reservoir section 220 are disconnected.

A frame 301, as shown in FIGS. 4-5, is arranged inside the housing 300. The frame 301 extends in the vertical direction 7 at a rightward position with respect to the cap 260 and faces the right-side wall 221C in the widthwise direction 9. The opener member 250 protrudes leftward from the frame 301 at a position coincident with the atmosphere communication path 221K in the widthwise direction 9 (see FIG. 5). A cross-sectional area of the opener member 250 at a section along the vertical direction 7 and the front-rear direction 8 is smaller than the opening of the atmosphere communication path 221K throughout an entire range in the widthwise direction 9. A length of the opener member 250 in the widthwise direction 9 is greater than a distance between the valve body 242 when the head 200 is at the capped position P21 and the frame 301. When the carriage 190 moves in the widthwise direction 9, and shortly before the head 200 on the carriage 190 reaches the capped position P21, a protrusive end of the opener member 250 may enter the atmosphere communication path 221K and contact the valve body 242. While the head 200 stays in the capped position P21, the valve body 242 is separated from the right-side wall 221C by a contacting force from the opener member 250 against the urging force of the spring 241. Therefore, the valve body 242 may open the atmosphere communication path 221K. In other words, the opener member 250 may switch the valve body 242 from the closing state to the opening state. Thus, the valve body 242 may switchably open and close the atmosphere communication path 221K. Accordingly, the atmosphere communication path 221K may be placed in a connecting state, in which the ink reservoir chamber 220B and the outside of the reservoir section 220 are connected to communicate.

The opener member 250 forms another part of the switching assembly.

[Cap 260]

As shown in FIGS. 4-5, the cap 260 is located at a position substantially same as the head 200 in the front-rear direction 8 and has an approximately rectangular-boxed shape in a top plan view. An upper end of the cap 260 is open upward. The cap 260 may be formed of an elastic material such as rubber.

The cap 260 is supported by a frame 302, which spreads in the front-rear direction 8 and the widthwise direction 9, through a lift assembly 261. The lift assembly 261 may move the cap 260 vertically between a capping position P31 and an uncapping position P32 by a driving force generated under control of the controller 270 by a lift motor 274 (see FIG. 7). The capping position P31 is a position, at which the upper end of the cap 260 contacts the lower face 201 of the head 200 being located at the capped position P21. In other words, the capped position P21 coincides with the capping position P31 in the widthwise direction 9. The cap 260 at the capping position P31 may cover the nozzles 203 formed in the lower face 201 of the head 200. The uncapping position P32 is lower than the capping position P31 and is a position, at which the upper end of the cap 260 is separated from the lower face 201 of the head 200.

On a bottom 262 (see FIG. 5) of the cap 260, a plurality of through holes 263 are formed, although in FIG. 5 solely one of the plurality of through holes 263 is shown. To each of the through holes 263, a tube 264 is connected at one end so that the through hole 263 and the tube 264 are in fluid communication. The other end of the tube 264 is connected to a pump, which is not shown. The pump may be activated by the controller 270 when the cap 260 is at the capping position P31. Accordingly, obstacles and the ink remaining in the head 200 may be vacuumed and collected on the cap 260. The collected obstacles on the cap 260 may be transported through the tubes 264 to a waste tank, which is not shown.

[Controller 270]

As shown in FIG. 7, the controller 270 includes a CPU, a ROM, a RAM, an EEPROM, and an ASIC, which are mutually connected through internal buses. The ROM may store programs to control the operations in the printer 100. The CPU may run the programs with use of the RAM and the EEPROM.

The ASIC is electrically connected with the motors 271-274. The ASIC may generate and output controlling signals V21, V22, V23, V24 to rotate the feeder motor 271, the conveyer motor 272, the carriage motor 273, and the lift motor 274, respectively. The ASIC is electrically connected with the liquid amount sensor 216, the registration sensor 151, the linear encoder 193, and the sheet sensor 205 and may receive the liquid amount signals V12, the registration signals V13, the pulse signals V15, and the sheet signals V16 from the liquid amount sensor 216, the registration sensor 151, the linear encoder 193, and the sheet sensor 205, respectively.

The controller 270 has a total consumed amount counter in, for example, the EEPROM. The total consumed amount counter may be used to cumulatively estimate consumed ink amount in the reservoir section 220. The cumulation by the total consumed amount counter may start immediately after an ink injecting process. In the following paragraphs, a counter value indicated by the total consumed amount counter may be called as a counter value C1.

The controller 270 has a timer 275 as an internal circuit of the CPU. The timer 275 may, according to an instruction from the CPU, measure a length of time elapsed from a point when a command is input. When the elapsed time reaches a predetermined time threshold value, the timer 275 returns a response indicating the reach to the CPU. While the valve body 242 closes the atmosphere communication path 221K, and when the ink in the ink reservoir chamber 220B is reduced, intensity of air pressure in the inner space 220A may decrease as the time elapses. In this regard, the elapsed time measured by the timer 275 is an element that may cause change in the air pressure in the reservoir section 220 depending on a length. The time threshold value is set to a time length shorter than a time length that may cause the menisci in the nozzles 203 to collapse due to the increased negative pressure in the inner space 220A. The time length that may cause the menisci in the nozzles 203 to collapse may be determined in advance by a manufacturer.

As shown in FIG. 7, the printer 100 may additionally have a meteorological sensor 217, a liquid level sensor 218, and a rotary encoder 164. These sensors may not necessarily be essential to the printer 100 in the present embodiment; therefore, explanation of these is herein omitted.

[Image Recording Process by Controller 270]

When the printer 100 is standing by for image recording, the head 200, the cap 260, and the valve unit 240 are at positions shown in FIG. 8. In this arrangement, the head 200 is standing by at a home position, which may be, in the present embodiment, the capped position P21. Meanwhile, the capped position P21 may also be an origin point, from which the head 200 starts moving in the widthwise direction 9. Optionally, however, the home position may be any position between the platen 180 and the cap 260 in the widthwise direction 9 or may be at a position rightward with respect to the cap 260. The cap 260 stays at the capping position P31 and covers the nozzles 203 of the head 200. The valve body 242 is subject to the contacting force of the opener member 250 and opens the atmosphere communication path 221K to place the atmosphere communication path 221K in the connecting state. The lid 230 closes the injection port 224A.

When the printer 100 is standing by or running an image recording process, the controller 270 may receive a print job and store the received print job in, for example, the RAM. A sender of the print job may be a personal computer or a smartphone which may communicate with the printer 100. The print job is an execution command for an image recording process and includes at least image data and setting information. The image data describes an image to be recorded in the image recording process. The image data may describe an image to be recorded on a single sheet M or a plurality of images to be recorded on a plurality of sheets M. The setting information describes settings for the image recording process including, for example, a size of the sheet(s) M, margins on the sheet(s) M, and resolutions of the image(s).

The controller 270 may select one of print jobs stored in the RAM and start an image recording process (see FIGS. 9A-9B) based on the selected print job.

As shown in FIG. 9A, in S101, the controller 270 generates driving signals in the RAM based on the image data. The driving signals may be used for driving the piezoelectric devices in the head 200 and are generated for the entire passes that are required to record the image described in the image data.

In S102, the controller 270 conducts an estimating process and a cumulation process for estimated total consumable amounts of the ink. The estimated total consumable amount is an amount of the ink to be consumed by the head 200 with the piezoelectric devices driven by the entire driving signals generated in S101. Moreover, in S102, the controller 270 adds the estimated total consumable amount of the ink to the counter value C1 in the total consumed amount counter.

In S103, the controller 270 determines whether the current counter value C1 exceeds a volume threshold value. The volume threshold value indicates a predetermined amount of the ink storable in the ink reservoir chamber 220B between the lower index 223L and the upper index 223U. When the controller 270 determines that the current counter value C1 exceeds the volume threshold value, the controller 270 proceeds to S117. When the controller 270 determines that the current counter value C1 does not exceed the volume threshold value, the controller 270 proceeds to S104.

In S104, the controller 270 determines whether an empty flag in the RAM or the EEPROM is off. The empty flag may be set off after an ink injecting process (S117-S119), which will be described further below. The empty flag may be set on in a remaining amount verifying process in S115 (see FIG. 9B), which will be described further below. When the empty flag is off, the controller 270 proceeds to S105; but when the empty flag is on, the controller 270 proceeds to S117.

In S105, the controller 270 conducts a flushing process. In particular, as an earlier step in the flushing process, the controller 270 conducts a separating step, in which the controller 270 outputs the controlling signals V24 to control the lift assembly 261 through the lift motor 274 to lower the cap 260 from the capping position P31 to the uncapping position P32 (see FIG. 5).

As a latter step in the flushing process, the controller 270 moves the head 200 in the widthwise direction 9 to the flushing position P22. In particular, the controller 270 outputs the controlling signals V23 to the carriage motor 273 to control the conveyer 210 to move the carriage 190 in the widthwise direction 9. While the carriage 190 is being moved, the controller 270 determines an updated position of the head 200 based on the pulse signals V15 from the linear encoder 193. Until the updated position matches the flushing position P22, the controller 270 continues moving the head 200 in the widthwise direction 9 toward the flushing position P22. When the updated position of the head 200 matches the flushing position P22, the controller 270 stops the head 200 at the flushing position P22 and controls the head 200 staying over the ink receiver 194 to discharge the ink at the ink receiver 194. The flushing process is thus conducted.

After the flushing process, further in S105, the controller 270 conducts a moving process, in which the controller 270 outputs the controlling signals V23 to the carriage motor 273 and moves the head 200 from the flushing position P22 to the home position, i.e., the capped position P21. Meanwhile, the controller 270 monitors updated positions of the head 200 periodically and, when the updated position matches the capped position P21, the controller 270 stops outputting the controlling signals V23. The process in S105 ends thereat.

In S106, the controller 270 selects a unit of the driving signals stored in the RAM for a pass to be run in a discharging process in S110 (see FIG. 9B).

In S107, the controller 270 conducts a cueing process and controls one of the sheets M in the feeder tray 110 to be conveyed to a cueing position, which is a position in the linear path P2 straight below the sheet sensor 205. In the cueing process, in particular, the controller 270 outputs the controlling signals V21 to the feeder motor 271 to control the feeder roller 133 to convey the sheet M in the curved path P1. While outputting the controlling signals V21, the controller 270 obtains registration signals V13 from the registration sensor 151 periodically and stops outputting the controlling signals V21 in response to change of levels of the obtained registration signals V13. Thus, the sheet M may pause at the position of the conveyer roller pair 160.

In the cueing process, after stopping the controlling signals V21, the controller 270 outputs the controlling signals V22 to the conveyer motor 272 to control the conveyer roller pair 160 to convey the sheet M to the cueing position in the linear path P2. While outputting the controlling signals V22, the controller 270 obtains the sheet signals V16 periodically and stops outputting the controlling signals V22 in response to change of levels of the obtained sheet signals V16. Thus, the sheet M may pause on the supporting surface 181 with a frontward edge of the sheet M located at the cueing position.

In S108, the controller 270 determines an ink dischargeable range R11 (see FIG. 8) based on the size of the sheet M and the margin size contained in the setting information in the print job. The ink dischargeable range R11 is a range, in which the ink may be discharged at the sheet M on the supporting surface 181, and is a remainder of subtracting the margin size from each side of the sheet M.

In S109 (see FIG. 9B), the controller 270 outputs the controlling signals V23 to the carriage motor 273 to move the head 200 from the capped position P21 to a position straight above a discharge-start position in the ink dischargeable range R11. The discharge-start position is an initial position for the head 200 when an image for a single pass is to be recorded on the sheet M on the supporting surface 181.

Before S109, in other words, when the head 200 is located at the capped position P21, as shown in FIG. 8, the atmosphere communication path 221K is in the connecting state. From this position, while the head 200 moves from the capped position P21 to the position above the ink dischargeable range R11 in S109, the valve body 242 separates from the opener member 250 and closes the atmosphere communication path 221K by the urging force of the spring 241 (see FIG. 5). Therefore, the atmosphere communication path 221K is shifted to the disconnecting state. In other words, in S109, the switching assembly may place the atmosphere communication path 221K in the disconnecting state.

In S109, moreover, the controller 270 conducts a measure-start process. In particular, as the controller 270 starts outputting the controlling signals V23, in other words, as the head 200 starts moving from the capped position P21, the controller 270 conducts the measure-start process, in which the controller 270 activates the timer 275 to start measuring time.

In S110, the controller 270 conducts a conveying process, in which the head 200 is conveyed in the scanning direction 9, i.e., the widthwise direction 9, and a discharging process. The conveying process to convey the head 200 in the scanning direction 9 may be hereinafter called as a scanning process. In particular, in the scanning process, the controller 270 outputs the controlling signals V23 to the carriage motor 273 to control the conveyer 210 to convey the head 200 in one way, i.e., rightward or leftward, in the scanning direction 9 for a pass.

The discharging process may be conducted with the atmosphere communication path 221K being closed and while the controlling signals V23 are being output in the scanning process. In particular, while the head 200 is moving above the ink dischargeable range R11, the controller 270 applies the unit of driving signals selected in either S106 (see FIG. 9A) or S114 (see FIG. 9B) to the piezoelectric devices in the head 200. Therefore, the piezoelectric devices may be driven, and the ink may be discharged from the head 200 through the nozzles 203. Accordingly, the image for the pass along the scanning direction may be recorded on the sheet M.

Having finished outputting the driving signal in the pass, the controller 270 stops outputting the controlling signals V23 and exits S110 thereafter.

In S111, the controller 270 conducts a condition determining process to determine whether a predetermined connection condition is satisfied. For a first example of the condition determining process, in particular, the controller 270 may determine whether the elapsed time measured by the timer 275 reaches a time threshold value. More specifically, the controller 270 may determine whether the elapsed time reached the time threshold value based on whether the controller 270 received the response from the timer 275 on or before S111. If the controller 270 did not receive the response from the timer 275, the controller 270 may determine that the elapsed time does not reach the time threshold value and proceed to S113. If the controller 270 received the response from the timer 275, the controller 270 may determine that the elapsed time reached the time threshold value and proceed to S112.

In S112, the controller 270 conducts a withdrawing process and a connecting process to move the head 200 to reciprocate in the scanning direction 9 between the updated position and the capped position P21. In particular, the controller 270 obtains the updated position of the head 200 based on the pulse signals V15 received from the linear encoder 193 and saves the updated position in, for example, the RAM, as a resume position for ink discharging process. Moreover, the controller 270 may move the head 200 rightward, similarly to S105 (see FIG. 9A), to withdraw to the capped position P21 (i.e., withdrawing process). In other words, the controller 270 moves the head 200 to an area, in which the head 200 may not face the sheet M on the supporting surface 181, in the scanning direction 9. When the head 200 reaches the capped position P21, the valve body 242 may receive the contacting force of the opener member 250 and shifts the atmosphere communication path 221K to the connecting state (i.e., connecting process). Thereafter, the controller 270 moves the head 200 leftward from the capped position P21 to return to the resume position. Furthermore, in S112, the controller 270 issues a reset command from the CPU to initialize the timer 275 and start measuring time.

It may be noted that the timer 275 was reset in S112 (see FIG. 9B) and thereafter started measuring time in S109. However, optionally, the timer 275 may cumulate amounts of time spent in discharging the ink since the printer 100 is powered on.

In S113, the controller 270 determines whether an entire image for the sheet M is completely recorded. When the controller 270 determines that the image recording is not completed, the controller 270 proceeds to S114, or when the controller 270 determines that the image recording is completed, the controller 270 proceeds to S115.

In S114, the controller 270 selects another unit of the driving signals for a next pass. Moreover, the controller 270 conducts an intermittent conveying process. In particular, in the intermittent conveying process, the controller 270 outputs the controlling signals V22 to the conveyer motor 272 to control the conveyer roller pair 160 to convey the sheet M in the conveying orientation 4, e.g., frontward, by a distance equal to a single pass in the conveying orientation 4 and controls the conveyer roller pair 160 to stop rotating. The controller 270 proceeds to S109.

In S115, the controller 270 conducts an ejecting process to eject the printed material M. In particular, the controller 270 may output the controlling signals V22 to the conveyer motor 272 to control the conveyer roller pair 160 and the ejection roller pair 170 to eject the printed material M through the sheet outlet 370 at the ejection tray 120. In the ejecting process, the controller 270 conveys the sheet M on the supporting surface 181 that has faced the lower surface 201 of the head 200 in the vertical direction 7 to an area, in which the sheet M may not face the lower surface 201 of the head 200, in the conveying orientation 4 (see FIG. 2).

In S115, further, the controller 270 conducts the remaining amount verifying process and, when the controller 270 determines that the level of the liquid amount signals V12 indicates the surface of the ink being higher than the lower index 223L, the controller 270 sets the empty flag off. On the other hand, when the controller 270 determines that the level of the liquid amount signals V12 indicates the surface of the ink being lower than or equal to the lower index 223L, the controller 270 determines that the amount of the ink in the reservoir section 220 reaches an injection threshold amount and sets the empty flag on.

In S116, the controller 270 determines whether image recording to record the entire images on the sheets M is completed. When the controller 270 determines that the image recording is not completed, the controller 270 proceeds to S104 (see FIG. 9A); or when the controller 270 determines that the image recording is completed, the controller 270 ends the image recording process shown in FIGS. 9A-9B.

[Ink Injecting Process (S117-S119)]

In S117 (see FIG. 9A), the controller 270 conducts an ink injecting process. In particular, the controller 270 conducts a moving process, in which the controller 270 moves the head 200 from the updated position to the capped position P21, similarly to S106. The controller 270 may output an audio message or an image alerting the user that the ink reservoir chamber 220B needs to be refilled with the ink. The user recognizing the alert may access the reservoir section 220 and open the lid 230, following a predetermined procedure for refiling. The user may attach a bottle (not shown) containing the ink to the injection port 224A and pour the ink in the bottle to the ink reservoir chamber 220B until the surface of the ink reaches the upper index 223U. In S118, the user may input a notice indicating that the ink reservoir chamber 220B is refilled through, for example, an operation interface (not shown) in the printer 100. In response to the user's input, in S119, the controller 270 initializes the counter value C1 to zero (0) and sets the empty flag off. Thereafter, the controller 270 proceeds to S105.

[Benefits]

In the printer 100, the controller 270 may control the valve body 242 in the valve unit 240 to open the atmosphere communication path 221K in response to the connection condition being satisfied, in other words, in response to the elapsed time reaching the time threshold value. Therefore, the air may be drawn into the air chamber 220 in the reservoir chamber 220 reliably, and the ink may be steadily supplied to the head 200 from the ink reservoir chamber 220B.

The connection condition to be satisfied is that the elapsed time reaches the time threshold value while the elapsed time may influence the air pressure in the ink reservoir chamber 220B. Therefore, based on this connection condition, the negative pressure in the reservoir section 220 may be restrained from increasing excessively.

In the withdrawing process in S112 (see FIG. 9B), the controller 270 controls the head 200 to move to the area, in which the head 200 may not face the sheet M on the supporting surface 181 in the vertical direction 7, and controls the valve body 242 to open the atmosphere communication path 221K. Therefore, even when the ink leaks out through the atmosphere communication path 221K, the leaked ink may be restrained from staining the sheet M.

Modified Examples

Although an example of carrying out the invention has been described, those skilled in the art will appreciate that there are numerous variations and permutations of the liquid discharging apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters. Described below will be modified examples of the present embodiment.

First Modified Example

When the valve body 242 closes the atmosphere communication path 221K and the ink in the ink reservoir chamber 220B is consumed, the air pressure in the inner space 220A may decrease due to the consumption of ink. The amount of the consumed ink correlates with the elapsed time from the start to the end of discharging the ink in the discharging process. When the amount of the ink is reduced while the amount of air in the inner space 220A is small, the air pressure in the inner space 220A may decrease relatively rapidly. On the other hand, when the ink is reduced while the air is sufficient, the air pressure may decrease relatively moderately compared to the situation when the amount of the air is small. In other words, a decreasing rate of the air pressure is inversely correlated with the amount of air in the inner space 220A. In this regard, the time threshold value in the timer 275 may be variable and may be set each time when the timer 275 is initialized. For example, the controller 270 may set a time threshold value which is greater than a time threshold value set in the timer 275 at a first round of initialization. This may allow the connecting process to be conducted less frequently while the air may be supplied to the air chamber 220C reliably. The variable time threshold value may also be set preferably by the manufacture.

Moreover, threshold values in other modified examples, some of which will be described below, may also be variable as well as the time threshold value in the first modified example.

Second Modified Example

The printer 100 in the second modified example may be different from the printer 100 in the embodiment described above in that the steps in S109-S112 in FIGS. 9A-9B are conducted based on meteorological signals V17 from the meteorological sensor 217.

The meteorological sensor 217 may be a barometric pressure sensor situated in the inner space 220A, more specifically, in the air chamber 220C, of the reservoir section 220, and may output the meteorological signals V17 to the controller 270. The meteorological signals V17 are signals indicating the air pressure of the air near the ink stored in the ink reservoir chamber 220B.

In S109 (see FIG. 9B), the controller 270 may, in place of the measure-start process, obtain the meteorological signals V17 and save a value of the air pressure indicated by the meteorologic signals V17 in the RAM as a first air pressure value.

In S110, the controller 270 may obtain the meteorological signals V17 from the meteorological sensor 217 after conducting the discharging process and save a value of the air pressure indicated by the meteorologic signals V17 in the RAM as a second air pressure value. Moreover, the controller 270 may determine an air pressure change amount, which is an amount of change from the first air pressure value to the second air pressure value within a specific period of time after conducting the discharging process (S110) in the previous round to the current round of discharging process (S110).

In S111, as a second example of the condition determining process, the controller 270 may determine whether the air pressure change amount reaches an air pressure threshold value, which is below the atmospheric pressure. The air pressure threshold value is set to a value substantially smaller than a pressure change amount, which may cause the menisci in the nozzles 203 to collapse due to the negative pressure in the inner space 220A. The air pressure threshold value may be determined by the manufacture while the printer 100 is being designed. If, in S111, the controller 270 determines that the air pressure change amount determined in S110 does not reach the air pressure threshold value, the controller 270 may proceed to S113, but if the controller 270 determines that the air pressure change amount reached the air pressure threshold, the controller 270 may proceed to S112.

In S112, in place of initializing the timer 275 and the measure-start process, the controller 270 may overwrite the first air pressure value with the second air pressure value. Therefore, the step in S111 in a next round may be conducted preferably based on the latest air pressure condition.

Benefit by Second Modified Example

According to the printer 100 in the second modified example, the controller 270 may conduct the connecting process in S112 based on the air pressure in the reservoir section 220; therefore, the menisci may be prevented from collapsing more reliably.

Second Modified Example (More Options)

For another example, since the air pressure in the reservoir section 220 is correlated with the air pressure in the reservoir section 220, the meteorological sensor 217 may be situated outside the reservoir section 220. In this context, the outside of the reservoir section 220 may either be an inner space in the housing 300 or a space, in which the printer 100 is installed. When the meteorological sensor 217 is located at a position separated from the printer 100, the controller 270 may be connected to the meteorological sensor 217 either in wires or wirelessly and may obtain the meteorologic signals V17 in wired or wireless communication.

For another example, the controller 270 may not necessarily conduct the condition determining process in S111 based on the air pressure change amount but may conduct the condition determining process based on a value of the air pressure indicated by the meteorologic signals V17.

For another example, since temperature and humidity are also correlated with the air pressure, the meteorological sensor 217 may be a temperature sensor or a humidity sensor. In this arrangement, the controller 270 may conduct the condition determining process in S111 based on degrees of temperature or humidity indicated by the meteorological signals V17 or changes in the degrees of temperature or humidity obtained from the meteorological signals V17. In other words, degree of temperature or humidity may be another element that may cause change in the air pressure in the reservoir section.

Third Modified Example

The printer 100 in the third modified example may be different from the printer 100 in the embodiment described above in that the steps in S109-S112 in FIGS. 9A-9B are conducted based on liquid level signals V18 from the liquid level sensor 218.

The liquid level sensor 218 may be, for example, a capacitance-typed liquid level sensor. The liquid level sensor 218 may be arranged in the ink reservoir chamber 220B and output the liquid level signals V18 to the controller 270. The liquid level signals V18 may be signals indicating the surface level of the ink in the ink reservoir chamber 220B. In the arrangement where the liquid level sensor 218 is the capacitance-typed liquid level sensor, the liquid level sensor 218 may have a pair of electrodes extending vertically in the ink reservoir chamber 220B. The liquid level sensor 218 may output the liquid level signals V18 indicating the capacitance between the electrodes that may change in response to increase or decrease of the ink in the ink reservoir chamber 220B.

In S109 (see FIG. 9B), the controller 270 may, in place of the measure-start process, obtain the liquid level signals V18 and save a value of the liquid level indicated by the liquid level signals V18 in the RAM as a first liquid level.

In S110, the controller 270 may obtain the liquid level signals V18 from the liquid level sensor 218 after conducting the discharging process and save a value of the liquid level indicated by the liquid level signals V18 in the RAM as a second liquid level. Moreover, the controller 270 may determine a liquid level change amount, which is an amount of change from the first liquid level to the second liquid level within the specific period of time described above in the second modified example. The liquid level change amount is correlated with the air pressure in the inner space 220A.

In S111, as a third example of the condition determining process, the controller 270 may determine whether the liquid level change amount reaches a liquid level threshold value. The liquid level threshold value is set to a value substantially smaller than a liquid level change amount, which may cause the menisci in the nozzles 203 to collapse due to the negative pressure in the inner space 220A. The liquid level threshold value may be determined by the manufacture while the printer 100 is being designed. If, in S111, the controller 270 determines that the liquid level change amount determined in S110 does not reach the liquid level threshold value, the controller 270 may proceed to S113, but if the controller 270 determines that the liquid level change amount reached the liquid level threshold value, the controller 270 may proceed to S112.

In S112, in place of initializing the timer 275 and the measure-start process, the controller 270 may overwrite the first liquid level with the second liquid level. Therefore, the step in S111 in a next round may be conducted preferably based on the latest liquid level condition.

Benefit by Third Modified Example

The liquid level is correlated with the consumed amount of the ink; therefore, according to the third modified example, again, the menisci may be prevented from collapsing more reliably.

Third Modified Example (More Options)

For another example, the controller 270 may not necessarily conduct the condition determining process in S111 based on the liquid level change amount but may conduct the condition determining process based on a level of the liquid surface indicated by the liquid level signals V18.

Fourth Modified Example

The printer 100 in the fourth modified example may be different from the printer 100 in the embodiment described above in that the memory in the controller 270, e.g., the EEPROM, has a consumed amount counter and that the steps in S109-S112 in FIGS. 9A-9B are conducted in the following manners. The consumed amount counter is different from the total consumed amount counter in that the consumed amount counter may be used for accumulation of the consumed amounts of the ink in the reservoir section 220.

In S102 (see FIG. 9A), the controller 270 may further conduct a determining process for estimated individual consumable amounts. In particular, the controller 270 may calculate estimated individual consumable amounts, each of which is an amount of the ink to be consumed by each unit of driving signals generated in S101 when the piezoelectric devices in the head 200 are driven according to the driving signals, and store the estimated individual consumable amounts in relation with the corresponding units of driving signals in the RAM. Each estimated individual consumable amount is an estimated value of an amount of the ink to be consumed for recording a pass of an image. In other words, the estimated individual consumable amount is an ink amount estimated in the estimating process.

In S109 (see FIG. 9B), in place of the measure-start process, the controller 270 may initialize a counter value C2 in the consumable amount counter to zero (0).

In S110, the controller 270 may read the estimated individual consumable amount related with the unit of driving signal most recently used in S110 from the RAM and add the estimated individual consumable amount to the counter value C2 in the consumed amount counter. The counter value C2 including the added estimated individual consumable amount indicates a changed amount of the ink, i.e., an amount of the ink consumed from the ink reservoir chamber 220B within a specific period, which is between the initialization of the consumed amount counter and the end of the discharging process.

In S111, as a fourth example of the condition determining process, the controller 270 may determine whether the counter value C2 reached a consumable amount threshold value. The consumable amount threshold value is set to a value substantially smaller than the liquid level change amount, which may cause the menisci in the nozzles 203 to collapse due to the negative pressure in the inner space 220A. The consumable amount threshold value may be determined by the manufacture while the printer 100 is being designed. If, in S111, the controller 270 determines that the counter value C2 does not reach the consumable amount threshold value determined in S110, the controller 270 may proceed to S113, but if the controller 270 determines that the counter value C2 reached the consumable amount threshold value, the controller 270 may proceed to S112.

In S112, after the withdrawing process and the connecting process, the controller 270 may, in place of initializing the timer 275 and the measure-start process, initialize the consumed amount counter. Thereby, the step in S111 in a next round may be conducted preferably.

Benefit by Fourth Modified Example

The counter value C2 of the estimated individual consumable amount is correlated with the consumed amount of the ink; therefore, according to the fourth modified example, again, the menisci may be prevented from collapsing reliably, and while the air may be supplied to the air chamber 220C in the reservoir section 220 reliably, the ink may be supplied to the head 200 stably.

Fifth Modified Example

The printer 100 in the fifth modified example may be different from the printer 100 in the embodiment described above in that the memory in the controller 270, e.g., the EEPROM, is provided with a sheet counter and that the steps in S109-S112, and S115 in FIGS. 9A-9B are conducted in the following manners. The sheet counter may be used to count a quantity of the sheet(s) M conveyed by the conveyer roller pair 160 and the ejection roller pair 170.

In S109 (see FIG. 9B), the controller 270 may, in place of the measure-start process, initialize a counter value C3 in the sheet counter to zero (0).

In S111, as a fifth example of the condition determining process, the controller 270 may determine whether the counter value C3 reached a sheet quantity threshold value, i.e., whether the counter value C3 is equal to or greater than the sheet quantity threshold value. The sheet quantity threshold value is set to a value substantially smaller than a quantity, which may be derived from experiments and determined by the manufacture, and may be a natural number equal to or greater than 1. If, in S111, the controller 270 determines that the counter value C3 does not reach the sheet quantity threshold value, the controller 270 may proceed to S113, but if the controller 270 determines that the counter value C3 reached the sheet quantity threshold value, the controller 270 may proceed to S112.

In S112, after the withdrawing process and the connecting process, the controller 270 may, in place of initializing the timer 275 and the measure-start process, initialize the sheet counter. Therefore, the step in S111 in a next round may be conducted preferably.

In S115, the controller 270 may conduct a counting process, in which the controller 270 increments the counter value C3 in the sheet counter by 1.

Benefit by Fifth Modified Example

The quantity of the sheets M, on which images are recorded in the discharging process, is correlated with the consumed amount of the ink; therefore, according to the fifth modified example, again, the menisci may be prevented from collapsing reliably, and while the air may be supplied to the air chamber 220C in the reservoir section 220 reliably, the ink may be supplied to the head 200 stably.

Fifth Modified Example (More Options)

Optionally, the steps S111, S112 may be conducted after S113, in which the controller 270 determines whether an entire image for the sheet M is completely recorded (S113: YES) or not (S113: NO).

For another example, the counter value C3 may not necessarily be initialized in the steps S109, S112. In the fifth modified example described above, the counter value C3 may be initialized in S109, S112; therefore, in S111, the controller 270 may compare the counter value C3 in the specific period between the initialization of the sheet counter and the end of the discharging process. More specifically, in the fifth modified example described above, the sheet counter may be initialized in S112, and the counter value C3 may be incremented by 1 in S115. In other words, the sheet counter counts and accumulates the quantity of the sheets M from the point of S112 when the connecting process is conducted. However, optionally, the sheet counter may count and accumulate a quantity of the sheets M since the printer 100 is powered on. In other words, the counter value C3 may not necessarily represent an amount of change in the sheet quantity but may represent the quantity of the sheets. In this arrangement, the sheet quantity threshold may be updated in S111.

Sixth Modified Example

The printer 100 in the sixth modified example may be different from the printer 100 in the embodiment described above in that the memory in the controller 270, e.g., the EEPROM, is provided with a conveyance number counter and that the steps in S109-S112, and S114 in FIGS. 9A-9B are conducted in the following manners. The conveyance number counter may be used to count a number of times of the intermittent conveying process conducted in S114.

In S109 (see FIG. 9B), the controller 270 may, in place of the measure-start process, initialize a counter value C4 in the conveyance number counter to zero (0).

In S110, the controller 270 may read the counter value C4 in the conveyance number counter from the RAM.

In S111, as a sixth example of the condition determining process, the controller 270 may determine whether the counter value C4 reached a conveyance number threshold value, in other words, whether the counter value C4 is equal to or greater than the conveyance number threshold value. The conveyance number threshold value is set to a value substantially smaller than a number, which may be derived from experiments and determined by the manufacture, and may be a natural number equal to or greater than 1. If, in S111, the controller 270 determines that the counter value C4 does not reach the conveyance number threshold value, the controller 270 may proceed to S113, but if the controller 270 determines that the counter value C4 reached the conveyance number threshold value, the controller 270 may proceed to S112. It may be noted that, similarly to the fifth modified example described above, the counter value C4 may or may not necessarily represent the amount of change in the number of times of intermittent conveyance of the sheet M within the period between the initialization of the conveyance number counter and the end of the discharging process.

In S112, after the withdrawing process and the connecting process, the controller 270 may, in place of initializing the timer 275 and the measure-start process, initialize the conveyance number counter. Thereby, the step in S111 in a next round may be conducted preferably.

In S114, the controller 270 may increment the counter value C4 in the conveyance number counter by 1 to update the counter value C4. Thus, the number of times of intermittent conveyance may be updated at each time the head 200 is conveyed for a pass.

Benefit by Sixth Modified Example

The number of times to conduct the intermittent conveying process is correlated with the consumed amount of the ink; therefore, according to the sixth modified example, again, the menisci may be prevented from collapsing reliably, and while the air may be supplied to the air chamber 220C in the reservoir section 220 reliably, the ink may be supplied to the head 200 stably.

Sixth Modified Example (More Option)

In the sixth example described above, the conveyance number counter may be initialized in S112, and the counter value C4 may be incremented by 1 in S114. In other words, the conveyance number counter counts and accumulates the number of times of intermittent conveyance since the connecting process is conducted in S112. However, optionally, the conveyance number counter may count and accumulate a number of times of intermittent conveyance since the printer 100 is powered on.

Seventh Modified Example

The printer 100 in the seventh modified example may be different from the printer 100 in the embodiment described above in that a rotary encoder 164 (see FIG. 7) is provided, that the memory in the controller 270, e.g., the EEPROM, is provided with a pulse number counter, and that the steps in S109-S112, and S114 in FIGS. 9A-9B are conducted in the following manners.

The rotary encoder 164 may have an encoder disc and an optical sensor. The encoder disc may be attached to a shaft of the driving roller 161 (see FIG. 2) and may rotate along with the driving roller 161. The encoder disc may have a plurality of first parts, which allow light emitted from the optical sensor to pass there-through, and second parts, which blocks the light emitted from the optical sensor. The first parts may be formed in a same shape and arranged along a circumferential direction of the shaft of the driving roller 161 at an equal interval. Each of the second parts is arranged between two (2) adjoining first parts along the circumferential direction. The optical sensor may include a light-emitter and a light-receiver, which are arranged to face each other across a circumferentially outer part of the encoder disc. The light-emitter may emit the light at the light-receiver, and the light-receiver may output pulse signals V19, of which level may vary depending on an amount of the light received, to the controller 270. While a rotation rate of the driving roller 161 is determined in advance, a number of pulses contained in the pulse signals V19 is correlated with the conveyance amount of the sheets M in the linear path P2.

The pulse number counter may be used to count the number of pulses contained in the pulse signals V19.

In S109 (see FIG. 9B), the controller 270 may, in place of the measure-start process, initialize a counter value C5 in the pulse number counter to zero (0).

In S110, the controller 270 may read the counter value C5 in the pulse number counter from the RAM.

In S111, as a seventh example of the condition determining process, the controller 270 may determine whether the counter value C5 reached a pulse number threshold value. The pulse number threshold value is set to a value substantially smaller than a number, which may be derived from experiments and determined by the manufacture. If, in S111, the controller 270 determines that the counter value C5 does not reach the pulse number threshold value, the controller 270 may proceed to S113, but if the controller 270 determines that the counter value C5 reached the pulse number threshold value, the controller 270 may proceed to S112. It may be noted that, similarly to the fifth modified example described above, the counter value C5 may or may not necessarily represent the amount of change in the number of pulses within the period between the initialization of the pulse number counter and the end of the discharging process.

In S112, after the withdrawing process and the connecting process, the controller 270 may, in place of initializing the timer 275 and the measure-start process, initialize the counter value C5 in the pulse number counter. Thereby, the step in S111 in a next round may be conducted preferably.

In S114, while the intermittent conveying process is being conducted, the controller 270 may obtain the pulse signals V19 from the rotary encoder 164 and conduct a counting process, in which the counter value C5 in the pulse number counter is incremented by the number of pulses contained in the obtained pulse signals V19.

Benefit by Seventh Modified Example

The number of pulses contained in the pulse signals V19 is correlated with the consumed amount of the ink; therefore, according to the seventh modified example, again, the menisci may be prevented from collapsing reliably, and while the air may be supplied to the air chamber 220C in the reservoir section 220 reliably, the ink may be supplied to the head 200 stably.

Eighth Modified Example

The printer 100 in the eighth modified example may be different from the printer 100 in the embodiment described above in that the memory in the controller 270, e.g., the EEPROM, is provided with a pulse number counter, and that the steps in S109-S112 in FIGS. 9A-9B are conducted in the following manners. The pulse number counter may be used to count a number of pulses contained in the pulse signals V15.

In S109 (see FIG. 9B), the controller 270 may, in place of the measure-start process, initialize a counter value C6 in the pulse number counter to zero (0).

In S110, during the discharging process, the controller 270 may obtain the pulse signals V15 from the linear encoder 193 and increment the counter value C6 by a number of pulses contained in the obtained pulse signals V15. While a rotation rate of the carriage motor 273 (see FIG. 7) is determined in advance, the number of pulses contained in the pulse signals V15 is correlated with the moving amount of the head 200. In other words, the number of pulses is generally correlated with amount of the ink to be consumed.

In S111, as an eighth example of the condition determining process, the controller 270 may determine whether the counter value C6 reached a pulse number threshold value. The pulse number threshold value is set to a value substantially smaller than a number, which may be derived from experiments and determined by the manufacture. If, in S111, the controller 270 determines that the counter value C6 does not reach the pulse number threshold value, the controller 270 may proceed to S113, but if the controller 270 determines that the counter value C6 reached the pulse number threshold value, the controller 270 may proceed to S112. It may be noted that, similarly to the fifth modified example described above, the counter value C6 may or may not necessarily represent the amount of change in the number of pulses within the period between the initialization of the conveyance number counter and the end of the discharging process.

In S112, after the withdrawing process and the connecting process, the controller 270 may, in place of initializing the timer 275 and the measure-start process, initialize the counter value C6 in the pulse number counter. Thereby, the step in S111 in a next round may be conducted preferably.

Benefit by Eight Modified Example

According to the eighth modified example, again, the menisci may be prevented from collapsing more reliably, and while the air may be supplied to the air chamber 220C in the reservoir section 220 reliably, the ink may be supplied to the head 200 stably.

Eighth Modified Example (More Option)

In the eighth example described above, the pulse number counter may be initialized in S112, and the counter value C6 may be incremented in S110. In other words, the pulse number counter counts and accumulates the number of pulses since the connecting process is conducted in S112. However, optionally, the pulse number counter may count and accumulate a number of pulses since the printer 100 is powered on.

Ninth Modified Example

The printer 100 in the ninth modified example may be different from the printer 100 in the embodiment described above in that the memory in the controller 270, e.g., the EEPROM, is provided with an execution number counter and that the steps in S106, S107, S109, S111, S112 in FIGS. 9A-9B are conducted in the following manners. The execution number counter may be used to count a number of times to conduct S107. The number of times to conduct S107 may be equivalent to the counter value C3 in the sheet counter described in the fifth modified example.

In S106 (see FIG. 9A), the controller 270 may initialize a counter value C7 in the execution number counter to zero (0). In S107, the controller 270 increments the counter value C7 by 1. In S109, the controller 270 may not conduct the measure-start process.

In S111 (see FIG. 9B), as a ninth example of the condition determining process, the controller 270 may determine whether the counter value C7 reached an execution number threshold value. The execution number threshold is set to a value substantially smaller than a quantity, which may be derived from experiments and determined by the manufacture. If, in S111, the controller 270 determines that the counter value C7 does not reach the execution number threshold value, the controller 270 may proceed to S113, but if the controller 270 determines that the counter value C7 reached the execution number threshold value, the controller 270 may proceed to S112. It may be noted that, similarly to the fifth modified example described above, the counter value C7 may or may not necessarily represent the amount of change in the number of times to conduct S107 within the period between the initialization of the conveyance number counter and the end of the discharging process.

In S112, the controller 270 may, in place of initializing the timer 275 and the measure-start process, initialize the counter value C7.

Benefit by Ninth Modified Example

According to the ninth modified example, again, the menisci may be prevented from collapsing reliably, and while the air may be supplied to the air chamber 220C in the reservoir section 220 reliably, the ink may be supplied to the head 200 stably.

Ninth Modified Example (More Options)

For another example, the controller 270 may not necessarily conduct S111 based on the number of times to conduct the feeding process in S107 but may conduct S111 based on a number of times to conduct the intermittent conveying process in S114, the discharging process in S110, or other step that may be conducted in the image recording process (see FIGS. 9A-9B).

For another example, the controller 270 may not necessarily conduct the condition determining process based on a number of times to be conducted by the controller 270 but may conduct the condition determining process based on a number of times of an action performed by the printer 100. In other words, the number of times of the process conducted by the controller 270 may substantially be equated to a number of times of the action performed by the printer 100.

Tenth Modified Example

In the embodiment described above, the condition determining process in S111 and the connecting process in S112 (see FIG. 9B) are conducted once the elapsed time exceeded the time threshold value and between image recording of two (2) consecutive passes. However, optionally, the condition determining process and the connecting process may be conducted at any timing after or during one of the steps S104-S116.

For example, the condition determining process and the connecting process may be conducted after the controller 270 determines that the entire image for the sheet M is completely recorded in S113 (S113: YES). In this arrangement, the connecting process may be conducted after finishing the discharging process in S110 with one of two (2) consecutive sheets M and before the discharging process in S110 with the other of the two consecutive sheets M.

For another example, the condition determining process and the connecting process may be conducted after the controller 270 determines that image recording to record the entire images on the sheets M is completed in S116 (S116: YES). In this arrangement, the connecting process may be conducted after the entire images described in the image data contained in the print job are completely recorded. In particular, when the printer 100 conducts the image recording process (see FIGS. 9A-9B) for each of a plurality of print jobs stored in the RAM sequentially, the connected process may be conducted between two consecutive print jobs. For another example, the connecting process may be conducted after recording images for a predetermined threshold number of print jobs are completely recorded and before another image for another print job is recorded. The predetermined number may be a natural number equal to or greater than 1.

Eleventh Modified Example (Modified Example of Switching Assembly)

For another example, the switching assembly may not necessarily have the conveyer 210, the valve unit 240, and the opener member 250 but may consist of, for example, an electromagnetic valve. The electromagnetic valve may include a solenoid and a valve body made of, for example, iron. The controller 270 may apply current to the solenoid, and thereby the valve body may be attracted to the solenoid. Accordingly, the atmosphere communication path 221K may be opened. On the other hand, when the controller 270 does not apply current to the solenoid, the valve body may separate from the solenoid, and the atmosphere communication path 221K may be closed.

Optionally, in the arrangement where the switching assembly is an electromagnetic valve, the controller 270 may conduct the condition determining process in S111 in parallel with the discharging process in S110. In this arrangement, the controller 270 may conduct the connecting process in S112 without conducting the withdrawing process. Thereby, the connecting process may be conducted while the head 200 is facing the supporting surface. Accordingly, the connecting process may be conducted in shorter time.

Optionally, in the arrangement where the switching assembly is an electromagnetic valve, moreover, the controller 270 may conduct the condition determining process and the connecting process after finishing the ejection process in S115. In the ejection process, the sheet M on the supporting surface 181 may be moved by the conveyer roller pair 160 and the ejection roller pair 170 from the area, in which the sheet M faces the head 200, to the area, in which the sheet M does not face the head 200, in the conveying orientation 4. With the atmosphere communication path 221K being opened by the connecting process, the ink may undesirably leak out from the atmosphere communication path 221K. However, by conducting the connecting process after the ejecting process, the leaked ink may be prevented from staining the sheet M.

In this context, the expression "after the ejecting process in S115" may mean, in a case where the printer 100 records images on a plurality of sheets M, after the ejecting process, in which one of the sheets M with a part of the images having been recorded thereon is ejected, and before the discharging process, in which another part of the images is recorded on a next one of the sheets M. Moreover, the expression "after the ejecting process in S115" may mean, in a case where the printer 100 records an image on a single sheet M, after the ejection process, in which the single sheet M with the image having been recorded thereon is ejected.

Twelfth Modified Example (Modified Example of Reservoir Section 220)

Next, the twelfth modified example will be described with reference to FIGS. 10A-10B. The printer 100 in the twelfth modified example may be different from the embodiment described above in that, as shown in FIG. 10A, the reservoir section 220 has four (4) ink reservoir chambers 220B, four (4) cylindrical walls 224, and four (4) lids 230. In the following paragraphs, the reservoir section 220 in the twelfth modified example will be described in light of the differences from the printer 100 in the embodiment described above, and items and structures that are substantially the same or similar to those in the printer 100 in the embodiment described above will be omitted or simplified. FIG. 10A is an illustrative view of the reservoir section 220 in the twelfth modified example viewed from the front side. FIG. 10B is an illustrative rightward view of the reservoir section 220 in the twelfth modified example.

As shown in FIG. 10A, the inner space 200A of the reservoir section 220 may be delimited by the outer wall 221 and divided into four ink reservoir chambers 220B by three (3) divider walls 225. The ink reservoir chambers 220B may store inks in different colors, which may be, for example, yellow, magenta, cyan, and black.

Each of the cylindrical walls 224 may be formed in the outer wall 221 at a position straight above from a corresponding one of the ink reservoir chambers 220B. Each of the lids 230 may be attached to and detached from an upper end of a corresponding one of the cylindrical walls 224 by the user to close and open a corresponding one of the injection ports 224A, which are open upward.

As shown in FIG. 10B, the reservoir section 220 has the atmosphere communication path 221K, which is substantially the same as the atmosphere communication path 221K in the embodiment described above. The ink reservoir chambers 220B may be connected with the outside of the reservoir section 220 through the air chamber 220C and the atmosphere communication path 221K. The atmosphere communication path 221K may connect the inside and the outside of the four ink reservoir chambers 220. Each of the ink reservoir chambers 220B is connected to the nozzles 203 in the head 200 through corresponding one of ink flow paths 204.

Moreover, the printer 100 in the twelfth modified example may be different from the printer 100 in the embodiment described above in that the memory in the controller 270, e.g., the EEPROM, has a consumed ink amount counter for each of the ink reservoir chambers 220, in other words, for each of the inks in the different colors, and that the steps S102 and S109-S112 in FIGS. 9A-9B are conducted in the following manners. Each consumed ink amount counter may be used to accumulate the consumed amount of the ink in each reservoir section 220.

In S102 (see FIG. 9A), the controller 270 may conduct a determining process to determine an estimated individual consumable amount for each of the inks. In particular, the controller 270 may calculate estimated individual consumable amounts, each of which is an amount of the ink to be consumed by a unit of the driving signals generated in S101 when the piezoelectric devices in the head 200 are driven according to the unit of driving signals, and store the estimated individual consumable amounts in relation with the respective units of driving signals in the RAM.

In S109 (see FIG. 9B), the controller 270 may, in place of the measure-start process, initialize a counter value C2 in each of the consumed ink amount counters to zero (0).

In S110, the controller 270 may read the estimated individual consumable amounts related with the units of driving signals used in S110 from the RAM and add the estimated individual consumable amounts to the counter values C2 in the respective consumed ink amount counters. The counter value C2 including the added estimated individual consumable amount indicates a changed amount of each ink, i.e., an amount of the ink consumed from the ink reservoir chamber 220B in a specific period, which is between initialization of the corresponding consumable amount counter and the end of the discharging process.

In S111, as a fourth example of the condition determining process, the controller 270 may determine whether any of the counter values C2 reached a consumable amount threshold value. The consumable amount threshold value may be, similarly to that in the fourth modified example, set to a value substantially smaller than the liquid level change amount, which may cause the menisci in the nozzles 203 to collapse due to the negative pressure in the inner space 220A. If, in S111, the controller 270 determines that none of the counter values C2 determined in S110 reached the consumable amount threshold value, the controller 270 may proceed to S113, but if the controller 270 determines that at least one of the counter values C2 reached the consumable amount threshold value, the controller 270 may proceed to S112.

In S112, after the withdrawing process and the connecting process, the controller 270 may, in place of initializing the timer 275 and the measure-start process, initialize the consumed amount counters. Thereby, the step in S111 in a next round may be conducted preferably.

Benefit by Twelfth Modified Example

According to the twelfth modified example, in which the printer 100 may record multicolored images, again, the air may be supplied to the air chamber 220C in the reservoir section 220 reliably. Moreover, when the consumed amount of any one of the four inks reaches the consumable amount threshold value, the air chamber 220C connected with the four ink reservoir chambers 220B may be connected to the atmosphere regardless of the color of the consumed ink so that the ink reservoir chambers 220B may be collectively connected with the outside of the reservoir section 220. In this arrangement, the processes to be conducted by the controller 270 may be simplified.

Twelfth Modified Example (Volume Vb of Air Portion)

Next, with reference to FIG. 11B, a volume Vb of an air portion will be described. The air portion is a part of the inner space 220A, i.e., a cavity, not occupied by the inks. The volume Vb is a volume of the air portion when surfaces of the inks are at the substantially same vertical position as upper indexes 223U. The volume Vb may be determined while being designed by the manufacturer in a following manner.

While the valve body 242 (see FIG. 10A) closes the atmosphere communication path 221K, in other words, the atmosphere communication path 221K is placed in the disconnecting state, in which the inside and the outside of the reservoir section 220 are disconnected, the controller 270 may conduct the discharging process to discharge the inks through the nozzles 203 of the head 200 at the sheet M on the supporting surface 181 to record a specific image based on specific image data under a specific condition. During the discharging process, as the time proceeds, with the atmosphere communication path 221K in the disconnecting state, the inks in the ink reservoir chambers 220B may be consumed, and the volume of the air portion may increase; therefore, the air pressure in the air portion may decrease.

Meanwhile, the printer 100 may conduct a flushing action before or during the image is recorded on the sheet M in the discharging process. In particular, the head 200 may, under the control of the controller 270, discharge the inks through the nozzles 203 at the ink receiver 194. Therefore, the volume of the air portion may increase even more by the flushing action, and the air pressure in the air portion may decrease, as the time proceeds. In the twelfth modified example, the discharging process includes acts of the controller 270 for the flushing action.

In this regard, duration of the discharging process may be the factor to change the air pressure in the reservoir section 220.

In the twelfth modified example, the air pressure of the air portion in the reservoir section 220 when the atmosphere communication path 221K is in the disconnecting state, i.e., one atmosphere (1 atm), may be represented by a sign Po. While a change in the volume of the air portion due to a change in volumes of the inks caused by the discharging process may be represented by a sign ΔV, and a change in the pressure of the air portion may be represented by a sign ΔP, the volume Vb is controlled to satisfy a formula:

$$Vb=(Po+\Delta P)*\Delta V/\Delta P \quad (1).$$

Moreover, while a pressure resistance of the menisci formed with the inks in the nozzles 203 may be represented by a sign Pm, ΔP satisfies a formula:

$$\Delta P<Pm \quad (2).$$

The pressure resistance Pm may be predetermined based on the specifications of the inks and the head 200. In order to calculate the pressure resistance Pm of the ink menisci, surface tension of the authentic inks provided by the manufacturer or distributor of the printer 100 and the contact angle with the authentic inks may be used. In particular, if a diameter of each nozzle 203 is d, the surface tension of the inks may be represented by a sign σ, and the contact angle of the inks at the lower face 201 of the nozzles 203 may be represented by a sign θ, Pm may be obtained from a formula:

$$Pm=4*\sigma*\cos\theta/d \quad (3).$$

Meanwhile, the diameter d of the nozzle 203 may be based on an exit diameter of the nozzle 203.

The surface tension σ may be obtained, for example, by the Wilhelmy method. The contact angle θ may be the contact angle when an ink is dropped on the lower face 201, which is the flat ink discharge surface, and may be obtained by, for example, the θ/2 method.

The specific image is a multicolor pattern image defined in ISO/IEC 24734, which is established by the International Organization for Standardization. The color pattern image is an image defined in ISO/IEC 24734, and is described in image data in a predetermined data format (doc format, xls format, pdf format, etc.).

The specific condition is recording the specific image continuously for 30 seconds on a sheet in A4-size in one of the speed priority mode and the high quality mode defined in ISO/IEC 24734. The specific condition includes, in particular, a resolution (CR×LF) and a margin size. The resolution may be, for example, 600×300 dpi. In a case of the doc format, the margin size is 34.3 mm on each of the top and the bottom, and 29.2 mm on each of the left and the right sides of the sheet. In a case of the xls format, the margin size is 3 mm on each of the top and the bottom, and 3 mm on each of the left and the right sides of the sheet.

When the volume Vb of the air portion is determined in the manners described above, the controller 270 may have an air pressure sensor to detect the air pressure of the air portion in place of the timer 275. With the air pressure sensor, the controller 270 may not start timing by the timer 275 in S109 or reset the timer 275 in S112. Rather, the controller 270 may determine the amount of air pressure having been changed by subtracting the air pressure detected by the air pressure sensor in S110 from one atmosphere, and, in S111, determine whether the amount of change in the air pressure has reached ΔP being the air pressure threshold, in other words, whether a connection condition is satisfied. If the controller 270 determines that the amount of change in the air pressure has reached ΔP in S111, the controller 270 may proceed to S112, and if not, the controller 270 may proceed to S113.

Twelfth Modified Example (More Options)

For another example, the quantity of the reservoir chambers 220B in the reservoir section 220 may not necessarily be limited to four (4) but may be any quantity equal to or greater than two (2).

For another example, an electromagnetic valve may switch the states of the atmosphere communication path 221B between the connecting state and the disconnecting state.

Moreover, as shown in FIG. 11A, the inner space 220A in the reservoir section 220 may be divided by three (3) vertical divider walls 222A into four (4) sections, each of which has the ink reservoir chamber 220B and the air chamber 220C. In other words, the reservoir section 220 may include four (4) ink reservoir chambers 220B, four (4) air chambers 220C, and four (4) air portions. In this arrangement, each ink reservoir chamber 220B may be connected with the outside of the reservoir section 220 through one of the four air portions in four (4) individual atmosphere communication paths 221K individually. Moreover, to each of the air chambers 220C, an individual valve placement space 220D may be arranged at a rightward position with respect to the air chamber 220C. In each of the valve placement spaces 220D, the valve unit 240 may be arranged. The frame 301 may have four (4) opener members 250, each of which corresponds to one of the four valve units 240. As the head 200 moves to the capped position P21 in accordance with a determination by the controller 270 that at least one of the ink reservoir chambers 220 satisfies the connection condition, the opener members 250 may switch the respective valve units 240 to the connecting state collectively and substantially simultaneously, and as the head 200 leaves the capped position P21, the opener members 250 may switch the respective valve units 240 to the disconnecting state.

Thirteenth Modified Example (Modified Example of Opener Member 250)

In the embodiment described above, the opener member 250 protrudes from the frame 301 toward the valve body 242 (see, for example, FIGS. 4 and 5). However, alternatively, the opener member 250 may protrude from the valve body 242 outward from the outer wall 221 through the atmosphere communication path 221K, as shown in FIGS. 12A-12B. In this arrangement, the opener member 250 may contact the frame 301 as the head 200 moves toward the capped position P21, and thereby the valve body 242 may shift the atmosphere communication path 221K to the connecting state (see FIG. 12A). On the other hand, the opener member 250 may separate from the frame 301 as the head 200 leaves the capped position P21, and thereby the valve body 242 may shift the atmosphere communication path 221K to the disconnecting state (see FIG. 12B).

Fourteenth Modified Example (Modified Example of Cap 260 and Lift Assembly 261)

In the embodiment described above, the lift assembly 261 may move between the capping position P31 and the uncapping position P32 by the driving force transmitted from the lift motor 274. Alternately, the cap 260 and the lift assembly 261 may be moved by use of the carriage 190 moving in the scanning direction 9. While the cap 260 and the lift assembly 261 are in known configurations, in the following paragraphs, description of those will be simplified.

The cap 260 may have a contact member 265, as shown in FIG. 13B, which may contact the carriage 190 moving in the scanning direction 9. The cap 260 may move in the scanning direction 9 as the contact member 265 is pushed by the carriage 190.

The lift assembly 261 may have a first guiding surface 266, a second guiding surface 267, and an inclined surface 268. The first guiding surface 266 may spread in the front-rear direction 8 and the widthwise direction 9 at a position rightward with respect to the platen 180 and support the cap 260 at the uncapping position P32. The second guiding surface 267 may spread in the front-rear direction 8 and the widthwise direction 9 at a position rightward with respect to the first guiding surface 266 and support the cap 260 at the capping position P31. The inclined surface 268 is a plain surface connecting a rightward end of the first guiding surface 266 and a leftward end of the second guiding surface 267.

The cap 260 moving in the scanning direction 9 may move between the first guiding surface 266 and the second guiding surface 267 via the inclined surface 268. Therefore, when the cap 260 is supported by the second guiding surface 267 (see FIG. 13A), the cap 260 may cover the nozzles 203

(not shown in FIGS. 13A-13B) at the capping position P31. On the other hand, when the cap 260 is supported by the first guiding surface 266 (see FIG. 13B), the cap 260 may be located at the uncapping position P32.

Fifteenth Modified Example

In the second modified example, the controller 270 determines whether the amount of change in the air pressure in the specific period of time, i.e., from the end of the discharging process (S111) in the previous round to the discharging process (S111) in the latest round, has reached the air pressure threshold value. However, the controller 270 may not necessarily determine whether the amount of change in the air pressure in the specific period of time has reached the air pressure threshold value. For example, the controller 270 may determine whether the amount of change in the ink in a specific period of time measured by, for example, a timer reached the consumable amount threshold. Moreover, the specific period of time may either be a fixed length or a variable length.

Moreover, the specific period of time mentioned in the third through ninth modified examples may either be, again, a fixed length or a variable length.

Benefit by Fifteenth Modified Example

With the specific period of time being variable, a number of times to conduct the connecting process may be preferably adjusted.

More Examples

For another example, the liquid discharging apparatus may not necessarily be limited to the printer 100 as described above but may be a multifunction peripheral machine, a copier, and a facsimile machine. The multifunction peripheral machine may be an apparatus equipped with a plurality of functions among a printing function, a copying function, and a facsimile transmitting/receiving function.

For another example, the printer 100 may have a line-formation printing head in place of the serial-formation printing head 200 when the switching assembly consists of an electromagnetic valve. In the printer 100 with the line-formation printing head 200, the head 200 may not be conveyed in the scanning direction 9 but may stay still at a position above the platen 180.

For another example, the printer 100 may not necessarily be limited to the on-carriage printer but may be a so-called off-carriage printer, in which the reservoir section 220 may not be mounted on the carriage 190 but may be located separately from the carriage 190. When the printer 100 is the off-carriage printer, the reservoir section 220 may not move in the widthwise direction 9 inside the housing 300; therefore, the switching assembly may preferably consist of an electromagnetic valve.

For another example, the sheet M may not necessarily be conveyed in the linear path P2 by the conveyer roller pair 160 and the ejection roller pair 170, or may not necessarily be supported in the linear path P2 by the platen 180 from below. Alternatively, the printer 100 may have a conveyer belt, which may roll by the driving force of, for example, the conveyer motor 272 to convey the sheet M in the linear path P2 in the conveying orientation 4.

For another example, the rotary encoder 164 may not necessarily be attached to the driving roller 161 but may be attached to a rotating body, which may transmit the driving force from the conveyer motor 272 to the driving roller 161. The rotating body may be, for example, an output shaft of the conveyer motor 272 and a gear that may be arranged on a driving force transmitting path between the conveyer motor 272 and the driving roller 161.

For another example, the reservoir section 220 may not necessarily be the ink tank fixed to the head 200 but may be a cartridge detachably attached to the head 200.

What is claimed is:

1. A liquid discharging apparatus, comprising:
- a head configured to discharge liquid;
- a rotating body configured to convey a sheet in a conveying orientation;
- a carriage, on which the head is mounted, the carriage being configured to move in a scanning direction, the scanning direction intersecting with the conveying orientation,
- a reservoir section, having:
  - a liquid reservoir chamber configured to store the liquid; and
  - a communication path connecting the liquid reservoir chamber with outside,
- a liquid flow path connecting the head with the liquid reservoir chamber for the liquid to flow therein;
- a switching assembly configured to switch states of the communication path between a connecting state, in which the communication path connects the liquid reservoir chamber with the outside, and a disconnecting state, in which the communication path disconnects the liquid reservoir chamber from the outside; and
- a controller configured to:
  - control the switching assembly to switch the states of the communication path from the connecting state to the disconnecting state;
  - after switching the states of the communication path from the connecting state to the disconnecting state, control the head to discharge the liquid at the sheet;
  - after switching the states of the communication path from the connecting state to the disconnecting state, and in response to a predetermined connection condition being satisfied, control the switching assembly to switch the states of the communication path from the disconnecting state to the connecting state;
  - control the carriage to move the head to withdraw to an area where the head does not face the sheet in the scanning direction, in response to the predetermined connection condition being satisfied; and
  - control the switching assembly to switch the states of the communication path from the disconnecting state to the connecting state in response to the head withdrawn to the area.

2. The liquid discharging apparatus according to claim 1, wherein the predetermined connection condition is an amount of an element that causes change in air pressure in the reservoir section reaching a threshold value.

3. The liquid discharging apparatus according to claim 2, wherein the amount of the element is at least one of degree of temperature, degree of humidity, intensity of air pressure, an amount of change in the degree of temperature, an amount of change in the degree of humidity, and an amount of change in the air pressure in the reservoir section.

4. The liquid discharging apparatus according to claim 2, wherein the amount of the element is an amount of the liquid in the liquid reservoir chamber.

5. The liquid discharging apparatus according to claim 2, wherein, for discharging the liquid from the head after switching the states of the communication path from the connecting state to the disconnecting state, the controller is configured to estimate an amount of the liquid to be discharged, and wherein the amount of the element is the estimated amount of the liquid.

6. The liquid discharging apparatus according to claim 2, wherein the amount of the element is a length of elapsed time.

7. The liquid discharging apparatus according to claim 2, wherein the controller is configured to count sheets conveyed by the rotating body, and wherein the amount of the element is a number of the counted sheets.

8. The liquid discharging apparatus according to claim 2, wherein the controller is configured to control the rotating body to intermittently convey the sheet and stop conveying the sheet, wherein, for discharging the liquid from the head after switching the states of the communication path from the connecting state to the disconnecting state, the controller controls the carriage to convey the head in the scanning direction for a pass and controls the head to discharge the liquid at the sheet while the rotating body stops conveying the sheet, wherein the controller is configured to update a number of times of intermittent conveyance of the sheet by the rotating body at each time the head is conveyed for a pass, and wherein the amount of the element is the number of times of the intermittent conveyance.

9. The liquid discharging apparatus according to claim 2, further comprising:

a tray configured to store the sheet; and a feeder configured to feed the sheet from the tray;

wherein the rotating body is configured convey the sheet fed by the feeder in the conveying orientation, wherein the controller is configured to count a number of times of acts of the controller conducted, the acts of the controller including:

controlling the feeder to feed the sheet from the tray;

controlling the rotating body to convey the sheet; and controlling the head to discharge the liquid after switching the states of the communication path from the connecting state to the disconnecting state, and wherein the amount of the element is the number of times of the acts of the controller conducted.

10. The liquid discharging apparatus according to claim 1, wherein the controller is configured to receive a job, after switching the states of the communication path from the connecting state to the disconnecting state, control the head to discharge the liquid based on the received job, and control the switching assembly to switch the states of the communication path from the disconnecting state to the connecting state in response to the predetermined connection condition being satisfied and the job being completed.

11. The liquid discharging apparatus according to claim 1, wherein, after switching the states of the communication path from the connecting state to the disconnecting state, the controller is configured to control the head to discharge the liquid at a first sheet and a second sheet consecutively, wherein, after switching the states of the communication path from the connecting state to the disconnecting state, the controller is configured to control the switching assembly to switch the states of the communication path from the disconnecting state to the connecting state in response to the predetermined connection condition being satisfied and after finishing discharging of the liquid at the first sheet, and before starting discharging the liquid at the second sheet.

12. The liquid discharging apparatus according to claim 1, wherein the controller is configured to:

after switching the states of the communication path from the connecting state to the disconnecting state, control the head to discharge the liquid at the sheet; and control the switching assembly to switch the states of the communication path from the disconnecting state to the connecting state in response to the predetermined connection condition being satisfied and while the head faces the sheet.

13. The liquid discharging apparatus according to claim 1, wherein the controller is configured to:

control the rotating body to convey the sheet in the conveying orientation to the area where the sheet does not face the head, after the liquid is discharged from the head at the sheet; and control the switching assembly to switch the states of the communication path from the disconnecting state to the connecting state in response to the predetermined connection condition being satisfied and after finishing discharging of the liquid from the head at the sheet.

14. The liquid discharging apparatus according to claim 1, wherein the liquid reservoir chamber includes a plurality of liquid reservoir chambers, each of the plurality of liquid reservoir chambers containing liquid in a different color, and wherein the communication path is a common communication path connecting the plurality of liquid reservoir chambers with the outside.

15. The liquid discharging apparatus according to claim 1, wherein the liquid reservoir chamber includes a plurality of liquid reservoir chambers, each of the plurality of liquid reservoir chambers containing liquid in a different color, and wherein the communication path includes a plurality of individual communication paths, each of which connects one of the plurality of liquid reservoir chambers with the outside, wherein the switching assembly is configured to switch states of the plurality of individual communication paths collectively between a connecting state, in which the individual communication paths connect the plurality of liquid reservoir chambers with the outside, and a disconnecting state, in which the plurality of individual communication paths disconnect the plurality of liquid reservoir chambers from the outside, and wherein the controller is configured to control the switching assembly to switch the states of the communication path from the disconnecting state to the connecting state in response to at least one of the plurality of liquid reservoir chambers satisfying the predetermined connection condition.

16. A liquid discharging apparatus, comprising:

a head configured to discharge liquid;

a reservoir section, having:

- a liquid reservoir chamber configured to store the liquid; and
- a communication path connecting the liquid reservoir chamber with outside, a liquid flow path connecting the head with the liquid reservoir chamber for the liquid to flow therein;

a switching assembly configured to switch states of the communication path between a connecting state, in which the communication path connects the liquid reservoir chamber with the outside, and a disconnecting state, in which the communication path disconnects the liquid reservoir chamber from the outside; and a controller configured to:

- control the switching assembly to switch the states of the communication path from the connecting state to the disconnecting state;
- after switching the states of the communication path from the connecting state to the disconnecting state, control the head to discharge the liquid at a sheet; and
- after switching the states of the communication path from the connecting state to the disconnecting state, and in response to a predetermined connection condition being satisfied and while the head faces the sheet, control the switching assembly to switch the states of the communication path from the disconnecting state to the connecting state.

17. A liquid discharging apparatus, comprising:

a head configured to discharge liquid;

a reservoir section, having:

- a plurality of liquid reservoir chambers, each of the plurality of liquid reservoir chambers containing liquid in a different color; and
- a common communication path connecting each of the plurality of liquid reservoir chambers with the outside, a respective liquid flow path connecting the head with each liquid reservoir chamber, respectively, for the liquid to flow therein;

a switching assembly configured to switch states of the common communication path between a connecting state, in which the common communication path connects each of the plurality of liquid reservoir chambers with the outside, and a disconnecting state, in which the common communication path disconnects each of the plurality of liquid reservoir chambers from the outside; and a controller configured to:

- control the switching assembly to switch the states of the common communication path from the connecting state to the disconnecting state;
- after switching the states of the common communication path from the connecting state to the disconnecting state, control the head to discharge the liquid; and
- after switching the states of the common communication path from the connecting state to the disconnecting state, and in response to a predetermined connection condition being satisfied, control the switching assembly to switch the states of the common communication path from the disconnecting state to the connecting state.

* * * * *